(12) United States Patent
Samadani et al.

(10) Patent No.: US 10,515,199 B2
(45) Date of Patent: Dec. 24, 2019

(54) SYSTEMS AND METHODS FOR FACIAL AUTHENTICATION

(71) Applicant: QUALCOMM Incorporated, San Diego, CA (US)

(72) Inventors: Ramin Samadani, Menlo Park, CA (US); Hui Chao, San Jose, CA (US); Ayman Naguib, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 178 days.

(21) Appl. No.: 15/491,296

(22) Filed: Apr. 19, 2017

(65) Prior Publication Data

US 2018/0307815 A1   Oct. 25, 2018

(51) Int. Cl.
*G06K 9/00* (2006.01)
*G06F 21/32* (2013.01)

(52) U.S. Cl.
CPC .......... *G06F 21/32* (2013.01); *G06K 9/00315* (2013.01)

(58) Field of Classification Search
CPC ............... G06F 21/32; G06K 9/00288; G06K 9/00228; G06K 9/00315; G06K 9/6215; G06K 9/00268; G06T 7/248; G06T 2207/30201; H04N 5/23245
USPC ......................................................... 382/118
See application file for complete search history.

(56) References Cited

U.S. PATENT DOCUMENTS

| | | | |
|---|---|---|---|
| 9,607,138 B1 * | 3/2017 | Baldwin | G06F 21/32 |
| 10,043,063 B1 * | 8/2018 | Perfido | G06K 9/00771 |
| 10,111,103 B2 * | 10/2018 | Derakhshani | G06K 9/00268 |
| 2011/0317872 A1 * | 12/2011 | Free | G06K 9/00228 382/103 |
| 2013/0093943 A1 * | 4/2013 | Hongu | H04N 5/23212 348/349 |
| 2013/0342702 A1 * | 12/2013 | Zhang | G06K 9/00255 348/164 |
| 2014/0108528 A1 * | 4/2014 | Papakipos | G06Q 50/01 709/204 |
| 2014/0165187 A1 | 6/2014 | Daesung et al. | |
| 2015/0286865 A1 * | 10/2015 | McCoy | G06T 7/20 382/103 |
| 2015/0317513 A1 * | 11/2015 | Hu | G06K 9/00288 382/118 |
| 2015/0371078 A1 * | 12/2015 | Shiraishi | G06K 9/00228 382/103 |

(Continued)

*Primary Examiner* — Jerome Grant, II
(74) *Attorney, Agent, or Firm* — Austin Rapp & Hardman, P.C.

(57) ABSTRACT

A method performed by an electronic device is described. The method includes receiving a set of image frames. The set of image frames includes a face. The method also includes determining at least one facial motion of the face based on the set of image frames. The method further includes determining, based on the at least one facial motion, a facial rigidity confidence value indicating a degree of confidence that the face is rigid. The method additionally includes determining at least one facial micro-motion of the face based on the set of image frames. The method also includes determining a micro-motion matching confidence value indicating a degree of matching between the at least one facial micro-motion and a micro-motion profile. The method further includes authenticating a user based on the facial rigidity confidence value and the micro-motion matching confidence value.

30 Claims, 10 Drawing Sheets

(56) References Cited

U.S. PATENT DOCUMENTS

| | | | |
|---|---|---|---|
| 2016/0063503 A1* | 3/2016 | Kobres | G06F 21/316 |
| | | | 705/18 |
| 2016/0070967 A1 | 3/2016 | Du et al. | |
| 2016/0140405 A1 | 5/2016 | Graumann et al. | |
| 2016/0148066 A1 | 5/2016 | Duenias et al. | |
| 2016/0217338 A1* | 7/2016 | Li | G06K 9/00765 |
| 2016/0328874 A1* | 11/2016 | Tong | G06T 13/40 |
| 2016/0343130 A1 | 11/2016 | Wang et al. | |
| 2017/0053109 A1* | 2/2017 | Han | G06F 21/32 |
| 2018/0085010 A1* | 3/2018 | Jones | A61B 5/00 |
| 2018/0109719 A1* | 4/2018 | Nanu | H04N 5/23212 |
| 2018/0150684 A1* | 5/2018 | Wang | G06T 7/11 |
| 2018/0204097 A1* | 7/2018 | Karki | G06K 9/00281 |
| 2018/0249200 A1* | 8/2018 | Wang | G06K 9/00302 |
| 2018/0268207 A1* | 9/2018 | Kim | G06T 13/80 |
| 2018/0349682 A1* | 12/2018 | Wong | G06K 9/00288 |
| 2019/0108409 A1* | 4/2019 | Zhou | G06K 9/00288 |

\* cited by examiner

SYSTEMS AND METHODS FOR FACIAL AUTHENTICATION

FIELD OF DISCLOSURE

The present disclosure relates generally to electronic devices. More specifically, the present disclosure relates to systems and methods for facial authentication.

BACKGROUND

Some electronic devices (e.g., cameras, video camcorders, digital cameras, cellular phones, smart phones, computers, televisions, automobiles, personal cameras, action cameras, surveillance cameras, mounted cameras, connected cameras, robots, drones, smart applications, healthcare equipment, set-top boxes, etc.) capture and/or utilize images. For example, a smart phone may capture and/or process still and/or video images. Processing images may demand an amount of time, memory, and energy resources. The resources demanded may vary in accordance with the complexity of the processing.

Electronic security may be susceptible to circumvention in some cases. For example, hackers have developed approaches to defeat electronic security measures. As can be observed from this discussion, systems and methods that improve electronic security may be beneficial.

SUMMARY

A method performed by an electronic device is described. The method includes receiving a set of image frames. The set of image frames includes a face. The method also includes determining at least one facial motion of the face based on the set of image frames. The method further includes determining, based on the at least one facial motion, a facial rigidity confidence value indicating a degree of confidence that the face is rigid. The method additionally includes determining at least one facial micro-motion of the face based on the set of image frames. The method also includes determining a micro-motion matching confidence value indicating a degree of matching between the at least one facial micro-motion and a micro-motion profile. The method further includes authenticating a user based on the facial rigidity confidence value and the micro-motion matching confidence value. Determining the facial rigidity confidence value may include determining a degree of matching between the at least one facial motion and a global model.

The method may include determining whether the face is presented on a screen. Determining whether the face is presented on a screen may include determining temporal differences of the set of image frames and may include determining whether the temporal differences indicate one or more step functions corresponding to one or more screen refreshes. The authenticating may be further based on a screen detection confidence value.

The set of image frames may be captured at a frame rate of at least 120 frames per second. The set of image frames may be captured at a frame rate of at least 240 frames per second.

The method may include switching from a first capture rate to a second capture rate. The set of image frames may be captured at the second capture rate. The second capture rate may be higher than the first capture rate. The method may also include switching from the second capture rate to the first capture rate after capturing the set of image frames.

The method may include determining one or more facial micro-expressions. The authenticating may be based on the one or more facial micro-expressions. The method may include determining whether the one or more facial micro-expressions indicate duress.

An electronic device is also described. The electronic device includes a memory and a processor coupled to the memory. The processor is configured to receive a set of image frames. The set of image frames includes a face. The processor is also configured to determine at least one facial motion of the face based on the set of image frames. The processor is further configured to determine, based on the at least one facial motion, a facial rigidity confidence value indicating a degree of confidence that the face is rigid. The processor is additionally configured to determine at least one facial micro-motion of the face based on the set of image frames. The processor is also configured to determine a micro-motion matching confidence value indicating a degree of matching between the at least one facial micro-motion and a micro-motion profile. The processor is further configured to authenticate a user based on the facial rigidity confidence value and the micro-motion matching confidence value.

A non-transitory tangible computer-readable medium storing computer executable code is also described. The computer-readable medium includes code for causing an electronic device to receive a set of image frames. The set of image frames includes a face. The computer-readable medium also includes code for causing the electronic device to determine at least one facial motion of the face based on the set of image frames. The computer-readable medium further includes code for causing the electronic device to determine, based on the at least one facial motion, a facial rigidity confidence value indicating a degree of confidence that the face is rigid. The computer-readable medium additionally includes code for causing the electronic device to determine at least one facial micro-motion of the face based on the set of image frames. The computer-readable medium also includes code for causing the electronic device to determine a micro-motion matching confidence value indicating a degree of matching between the at least one facial micro-motion and a micro-motion profile. The computer-readable medium further includes code for causing the electronic device to authenticate a user based on the facial rigidity confidence value and the micro-motion matching confidence value.

An apparatus is also described. The apparatus includes means for receiving a set of image frames. The set of image frames includes a face. The apparatus also includes means for determining at least one facial motion of the face based on the set of image frames. The apparatus further includes means for determining, based on the at least one facial motion, a facial rigidity confidence value indicating a degree of confidence that the face is rigid. The apparatus additionally includes means for determining at least one facial micro-motion of the face based on the set of image frames. The apparatus also includes means for determining a micro-motion matching confidence value indicating a degree of matching between the at least one facial micro-motion and a micro-motion profile. The apparatus further includes means for authenticating a user based on the facial rigidity confidence value and the micro-motion matching confidence value.

DETAILED DESCRIPTION

Figure 1:
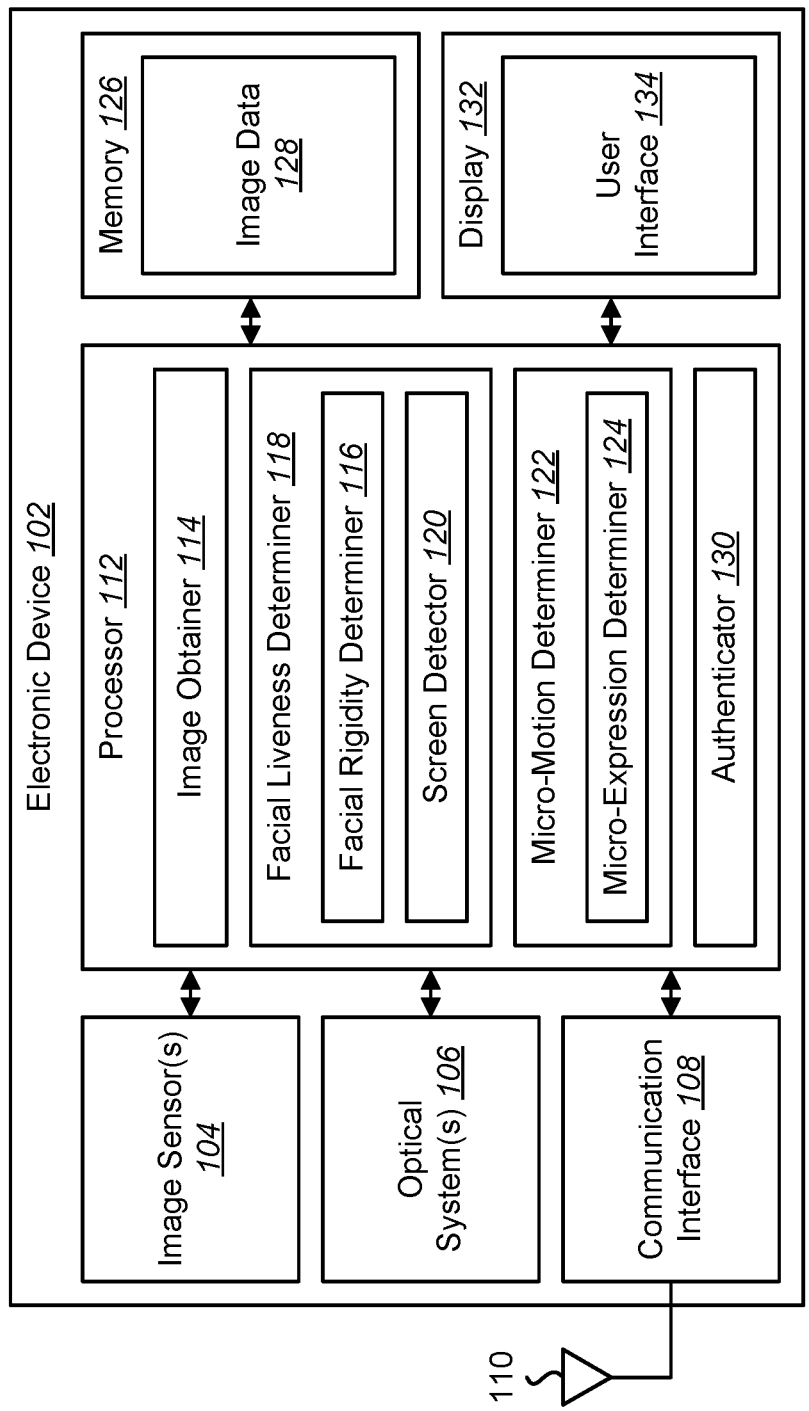
FIG. 1 is a block diagram illustrating one example of an electronic device in which systems and methods for facial authentication may be implemented.

The systems and methods disclosed herein may relate to facial authentication. For example, some configurations of the systems and methods disclosed herein may relate to high speed camera capture for spoof-hardened and/or robust user authentication. The systems and methods disclosed herein may be implemented on a variety of electronic devices (e.g., smart phones, cellular phones, mobile phones, tablet devices, laptop computers, desktop computers, vehicles, televisions, electronic locks, security systems, etc.). For example, some configurations of the systems and methods disclosed herein may provide discrete and/or continuous authentication on mobile phones. For instance, authentication may be implemented on mobile phones where high frame rate capture is used so that the authentication may be robust to different types of spoofing.

Spoofing may refer to techniques for defeating one or more security measures (e.g., authentication). For example, spoofing may utilize a substitute or counterfeit representation (e.g., a video shown on tablet or phone, a photograph, or three-dimensional (3D) mask) of a person in order to defeat an authentication procedure. For instance, authentication using facial recognition may be spoofed with photographs, tablets or smart phones (showing a person's photo or video), 3D rigid masks, or 3D flexible masks worn by someone else. A 3D flexible mask may be a very sophisticated spoofing method.

Some configurations of the systems and methods may address spoofing with different levels of sophistication. For example, it may be beneficial to distinguish a real person from one or more of the following representations: two-dimensional (2D) photographs, a display (e.g., smart phone or tablet) showing a video of the person, a 3D rigid mask of the person, a 3D flexible mask of the person being worn by someone else, and/or the real person under duress.

Some configurations of the systems and methods disclosed herein may utilize a high frame rate to provide spoof-hardened user authentication. For example, processing high frame rate images may be utilized to detect one or more of the following spoofing techniques.

High speed image capture (e.g., high frame rate video capture) may be utilized to detect spoofing and/or guard against spoofing. For example, image capture at a frame rate of 120 frames per second (FPS) or higher (e.g., high speed video capture at 240 frames per second) may provide capabilities not possible with standard video frame rate captures. Additionally or alternatively, different types of high speed video processing may be combined to detect a variety of spoofing. For instance, high speed image capture may enable and/or improve one or more of the following techniques.

High speed image capture may enable and/or improve distinguishing between a screen and a live scene because screen temporal differences may be very different from temporal differences in a live scene. For example, temporal differences may be utilized to distinguish between a screen (e.g., detect a smart phone or tablet showing video or photograph of a person) and a live scene (e.g., live face).

High speed image capture may enable and/or improve distinguishing rigid motions from non-rigid motions. Distinguishing non-rigid motions from rigid motions may distinguish real live faces from statues, masks (e.g., 3D rigid masks), or photographs (e.g., 2D photographs).

High speed image capture may enable and/or improve detection and/or processing of one or more micro-motions. Micro-motions may be utilized to determine facial liveness (e.g., identify liveness of a particular person versus a 3D flexible mask of the person worn by someone else). Additionally or alternatively, micro-motions may be utilized to determine whether the subject being authenticated is under duress due to coercion.

High speed image capture may enable and/or improve detection and/or processing of one or more micro-expressions to determine whether the subject being authenticated is under duress due to being coerced. For example, micro-expressions may be utilized to determine whether a particular person (e.g., the user, the subject, etc.) is under duress.

Some benefits and/or advantages of some configurations of the systems and methods disclosed herein may include one or more of the following. Additional hardware may not be needed in some configurations. For example, high speed video capture may be provided on some devices for other purposes (e.g., some smart phones may allow 240 FPS capture for capturing slow motion events). Accordingly, some configurations may provide passive continuous authentication without additional hardware. For example, some configurations may offer value (e.g., inexpensive implementation) by using elements (e.g., smart phone elements, sensors, etc.) to enable a new capability of passive and/or continuous authentication. Some configurations may provide reliable detection of a screen versus a live scene (e.g., live face). Some configurations may provide detection of user duress.

The systems and methods disclosed herein may provide a variety of approaches for detecting a true live face versus a spoofed face. High frame rate image capture (e.g., high frame rate video) may be utilized for reliable computation of the anti-spoofing features in some configurations. One or more of the following functions (e.g., steps) may be performed in some approaches. One or more short bursts of video at a high sampling rate may be acquired. Sampling short bursts may save power and random access memory (RAM). In some approaches, temporal analysis of temporal differences in the video may be performed to determine if the subject of the video is a screen or a live scene. For example, temporal differences may indicate step functions for some displays (e.g., liquid crystal displays (LCDs)) but not for real scenes. Facial recognition may be performed to identify (e.g., recognize) the user. In some approaches, motion on the face may be estimated to test for non-rigid motion (for a liveness test, for example). Extraction of micro-expressions may be performed to determine whether the live (e.g., non-rigid) subject is willing or under duress. In some configurations, the results two or more of the different functions may be combined to return an authentication value and/or a confidence (and/or probability) in the result. In some configurations, one or more of the functions (e.g., processing steps) may optionally be performed on a secure processor to preserve the user's privacy.

Some configurations of the systems and methods disclosed herein may utilize high speed video burst capture, a facial recognition element, a time difference element, and/or a motion estimation element that allows passive user authentication. Additionally or alternatively, some configurations may utilize an element to extract micro-motions and/or micro-expressions to determine user duress in order to determine user willingness to determine authentication.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one example of an electronic device 102 in which systems and methods for facial authentication may be implemented. Examples of the electronic device 102 may include cameras, video camcorders, digital cameras, cellular phones, smart phones, computers (e.g., desktop computers, laptop computers, etc.), tablet devices, media players, televisions, vehicles, automobiles, personal cameras, action cameras, surveillance cameras, mounted cameras, connected cameras, robots, aircraft, drones, unmanned aerial vehicles (UAVs), healthcare equipment, gaming consoles, personal digital assistants (PDAs), set-top boxes, etc. The electronic device 102 may include one or more components or elements. One or more of the components or elements may be implemented in hardware (e.g., circuitry), in a combination of hardware and software (e.g., a processor with instructions) and/or in a combination of hardware and firmware.

In some configurations, the electronic device 102 may include a processor 112, a memory 126, a display 132, one or more image sensors 104, one or more optical systems 106, and/or a communication interface 108. The processor 112 may be coupled to (e.g., in electronic communication with) the memory 126, display 132, image sensor(s) 104, optical system(s) 106, and/or communication interface 108. It should be noted that one or more of the elements illustrated in FIG. 1 may be optional. In particular, the electronic device 102 may not include one or more of the elements illustrated in FIG. 1 in some configurations. For example, the electronic device 102 may or may not include an image sensor 104 and/or optical system(s) 106. Additionally or alternatively, the electronic device 102 may or may not include a display 132. Additionally or alternatively, the electronic device 102 may or may not include a communication interface 108.

In some configurations, the electronic device 102 may present a user interface 134 on the display 132. For example, the user interface 134 may enable a user to interact with the electronic device 102. In some configurations, the display 132 may be a touchscreen that receives input from physical touch (by a finger, stylus, or other tool, for example). Additionally or alternatively, the electronic device 102 may include or be coupled to another input interface. For example, the electronic device 102 may include a camera facing a user and may detect user gestures (e.g., hand gestures, arm gestures, eye tracking, eyelid blink, etc.). In another example, the electronic device 102 may be coupled to a mouse and may detect a mouse click. In some configurations, one or more of the images described herein (e.g., set of image frames, video, etc.) may be presented on the display 132 and/or user interface 134.

The communication interface 108 may enable the electronic device 102 to communicate with one or more other electronic devices. For example, the communication interface 108 may provide an interface for wired and/or wireless communications. In some configurations, the communication interface 108 may be coupled to one or more antennas 110 for transmitting and/or receiving radio frequency (RF) signals. Additionally or alternatively, the communication interface 108 may enable one or more kinds of wireline (e.g., Universal Serial Bus (USB), Ethernet, etc.) communication.

In some configurations, multiple communication interfaces 108 may be implemented and/or utilized. For example, one communication interface 108 may be a cellular (e.g., 3G, Long Term Evolution (LTE), CDMA, etc.) communication interface 108, another communication interface 108 may be an Ethernet interface, another communication interface 108 may be a universal serial bus (USB) interface, and yet another communication interface 108 may be a wireless local area network (WLAN) interface (e.g., Institute of Electrical and Electronics Engineers (IEEE) 802.11 interface).

The electronic device 102 (e.g., image obtainer 114) may obtain one or more images (e.g., digital images, image frames, frames, video, etc.). In some configurations, the electronic device 102 (e.g., image sensor(s) 104 and/or image obtainer 114) may obtain (e.g., capture) a set of image frames (e.g., video) at a high frame rate (e.g., ≥120 FPS, ≥240 FPS, ≥480 FPS, ≥960 FPS, etc.). The one or more images (e.g., image frames) may be images of a scene (e.g., one or more objects and/or background). For example, the electronic device 102 may include one or more image sensors 104 and one or more optical systems 106 (e.g., lenses). An optical system 106 may focus images of objects that are located within the field of view of the optical system 106 onto an image sensor 104. The optical system(s) 106 may be coupled to and/or controlled by the processor 112 in some configurations.

A camera may include at least one image sensor and at least one optical system. Accordingly, the electronic device 102 may be one or more cameras and/or may include one or more cameras in some implementations. In some configurations, the image sensor(s) 104 may capture the one or more images (e.g., image frames, video, still images, burst mode images, etc.). In some implementations, the electronic device 102 may include multiple optical system(s) 106 and/or multiple image sensors 104. For example, the electronic device 102 may include multiple wide-angle lenses (e.g., fisheye lenses), multiple "normal" lenses, multiple telephoto lenses, and/or a combination of different kinds of lenses in some configurations. Different lenses may each be paired with separate image sensors 104 in some configurations. Additionally or alternatively, two or more lenses may share the same image sensor 104.

Additionally or alternatively, the electronic device 102 may request and/or receive the one or more images from another device (e.g., one or more external image sensors coupled to the electronic device 102, a network server, traffic camera, drop camera, automobile camera, web camera, smart phone camera, etc.). In some configurations, the electronic device 102 may request and/or receive the one or more images (e.g., image frames) via the communication interface 108. For example, the electronic device 102 may or may not include a camera (e.g., an image sensor 104 and/or optical system 106) and may receive images from one or more remote devices.

The memory 126 may store instructions and/or data. The processor 112 may access (e.g., read from and/or write to) the memory 126. Examples of instructions and/or data that may be stored by the memory 126 may include image data 128 (e.g., one or more sets of image frames, video, etc.), features, feature points, feature vectors, keypoint data, corner data, micro-motion data (e.g., micro-motion time sequences, micro-motion clusters, micro-motion profiles, etc.), micro-expression data (e.g., micro-expression clusters, micro-expression profiles, one or more micro-motions indicating a micro-expression, micro-expression emotions/conditions, etc.), image obtainer 114 instructions, facial liveness determiner 118 instructions, facial rigidity determiner 116 instructions, screen detector 120 instructions, micro-motion determiner 122 instructions, micro-expression determiner 124 instructions, authenticator 130 instructions, and/or instructions for other elements, etc.

In some configurations, the electronic device 102 (e.g., the memory 126) may include an image data buffer (not shown). The image data buffer may buffer (e.g., store) image data (e.g., image frame(s)) from the image sensor 104. The buffered image data may be provided to the processor 112.

In some configurations, the electronic device 102 may include a camera software application and/or a display 132. When the camera application is running, images of scenes and/or objects that are located within the field of view of the optical system(s) 106 may be captured by the image sensor(s) 104. The images that are being captured by the image sensor(s) 104 may be presented on the display 132. In some configurations, these images may be displayed in rapid succession at a relatively high frame rate so that, at any given moment in time, the objects that are located within the field of view of the optical system 106 are presented on the display 132. The one or more images obtained by the electronic device 102 may be one or more video frames, one or more still images, and/or one or more burst frames, etc. It should be noted that some configurations of the systems and methods disclosed herein may utilize a series of image frames (e.g., video).

The processor 112 may include and/or implement an image obtainer 114, a facial liveness determiner 118, a micro-motion determiner 122, a micro-expression determiner 124, and/or an authenticator 130. In some configurations, the facial liveness determiner 118 may include a facial rigidity determiner 116 and/or a screen detector 120. In some configurations, the micro-motion determiner 122 may include a micro-expression determiner 124. It should be noted that one or more of the elements illustrated in the electronic device 102 and/or processor 112 may be optional. For example, the facial liveness determiner 118, the micro-motion determiner 122, and/or the authenticator 130 may or may not be included and/or implemented. Additionally or alternatively, the facial rigidity determiner 116, the screen detector 120, and/or the micro-expression determiner 124 may not be included and/or implemented in some configurations. For example, some configurations may include a facial liveness determiner 118 with only one of the facial rigidity determiner 116 or the screen detector 120. Some configurations may include a facial liveness determiner 118 that operates based on the micro-motion determiner 122 without the facial rigidity determiner 116 and the screen detector 120. Some configurations may include a micro-motion determiner 122 but not the facial liveness determiner 118. In some configurations, the micro-motion determiner 122 may not include a micro-expression determiner 124. Other variations may be implemented.

In some configurations, one or more of the elements illustrated in the processor 112 may be implemented separately from the processor 112 (e.g., in other circuitry, on another processor, on a separate electronic device, etc.). For example, the image obtainer 114, the facial liveness determiner 118, the micro-motion determiner 122, and/or the authenticator 130 may be implemented on a secure processor. In some configurations, one or more of the image obtainer 114, the facial liveness determiner 118, the micro-motion determiner 122, and/or the authenticator 130 may be implemented on multiple processors and/or a combination of processors. In some configurations, the processor 112 may be a secure processor.

The processor 112 may include and/or implement an image obtainer 114. One or more images (e.g., image frames, video, burst shots, etc.) may be provided to the image obtainer 114. For example, the image obtainer 114 may obtain (e.g., receive) image frames from one or more image sensors 104. For instance, the image obtainer 114 may receive image data from one or more image sensors 104 and/or from one or more external cameras. As described above, the image(s) may be captured from the image sensor(s) 104 included in the electronic device 102 and/or may be captured from one or more remote camera(s). In some configurations, the image obtainer 114 may request and/or receive the set of images. For example, the image obtainer 114 may request and/or receive one or more images from a remote device (e.g., external camera(s), remote server, remote electronic device, etc.) via the communication interface 108.

In some configurations, the image obtainer 114 may obtain a set of image frames at a frame rate (e.g., frame capture rate). For example, the electronic device 102 may capture the set of image frames at a frame rate or the electronic device 102 may receive a set of image frames that has been captured by another device at a frame rate. In some configurations, the frame rate may be a "high" frame rate. Examples of high frame rates may be greater than or equal to 120 FPS, greater than or equal to 240 FPS, greater than or equal to 480 FPS, etc. In some configurations, the frame rate may be relative to a display rate (e.g., a display refresh rate). To satisfy Nyquist criteria (e.g., sampling theorem), for instance, the sampling rate may be at least twice the highest rate of the display. For example, the frame rate may be at least twice the rate of a most common display refresh rate for smart phones (or tablets, or televisions, etc.). For instance, if a most common display refresh rate for smart phones is 60 FPS or hertz (Hz), the frame rate (e.g., frame capture rate) may be configured to be greater than or equal to 120 FPS (e.g., ≥120 FPS, ≥240 FPS, ≥480 FPS, ≥960 FPS, etc.). Other (higher or lower) frame rates may be utilized, depending on the application.

In some configurations, the electronic device 102 may switch between capture rates. For example, the electronic device 102 may switch from a first capture rate (e.g., 30 FPS, 60 FPS, etc.) to a second capture rate (e.g., 120 FPS, 240 FPS, etc.), where the second rate is higher than the first capture rate. The electronic device 102 may switch to the second capture rate to obtain a set of image frame for authentication. After obtaining the set of image frames (e.g., capturing the set of image frames, receiving the set of image frames, and/or after authenticating a user, etc.), the electronic device 102 may switch to the first capture rate. For example, the electronic device 102 may switch from a lower capture rate (e.g., "normal" capture rate) to a higher capture rate for authentication. This approach may enable a lower frame rate for capturing regular video and an increased frame rate for capturing authentication video. Switching between capture rates may include instructing a camera (e.g., image sensor(s) 104 and/or a remote camera) to change capture rates.

The set of images (e.g., video) may include one or more faces. Each of the face(s) may represent a live face (e.g., the actual physical face of a person in the field of view of the camera that captured the image) or an artificial face (e.g., a photograph of a face, a video of a face, a statue of a face, a rigid mask of a face, a flexible mask of a face, etc.). For example, a live face may correspond to an initial capture of the actual face in the field of view of the camera, whereas an artificial face may not be an initial capture of the actual face (e.g., an artificial face may be a non-initial capture (e.g., an image of an image of the face) or some other non-actual representation (e.g., mask, 3D model, bust, etc.)) of a face. One or more of the faces may be utilized by the electronic device 102 for performing facial recognition and/or authentication.

The processor 112 may include and/or implement a facial liveness determiner 118. The facial liveness determiner 118 may determine a facial liveness of the face in the set of image frames. The facial liveness determiner 118 may determine the facial liveness based on one or more techniques or a combination of techniques for determining facial liveness. Examples of techniques for determining facial liveness may include determining a facial rigidity of the face, screen detection (e.g., determining whether the face is presented on a screen or is a live face), and micro-motion evaluation. The facial liveness determiner 118 may determine facial liveness (e.g., detect spoofing with a non-live or artificial face) based on facial rigidity, screen detection, micro-motion evaluation, or a combination of two or more techniques.

The facial liveness determiner 118 may include a facial rigidity determiner 116 in some configurations. The facial rigidity determiner 116 may determine a facial rigidity of the face in the set of image frames. Determining the facial rigidity may include estimating one or more facial motions. For example, the electronic device 102 (e.g., processor 112, facial liveness determiner 118, facial rigidity determiner 116, etc.) may track one or more facial features (e.g., feature points, keypoints, corners, etc.) over a subset of or all of the set of image frames.

The facial rigidity determiner 116 may determine whether the one or more facial motions are rigid or non-rigid (e.g., flexible). For example, the facial rigidity determiner 116 may determine a global motion model based on the one or more facial motions. For instance, the facial rigidity determiner 116 may determine a rigid transform of the facial features (e.g., feature points, keypoints, corners, etc.) between frames (e.g., from an initial frame to a later frame). The global motion model may correspond to a rigid transform, for example, where relative distances between facial features may be assumed to remain fixed (in 2D or 3D, for instance) while undergoing the transform (e.g., translation, rotation, projection, etc.).

In a case that the facial motion fits the global model (within a fitting threshold, for example), the facial rigidity determiner 116 may determine that the face is a rigid face. For example, the facial rigidity determiner 116 may detect spoofing with a rigid face (e.g., photograph of a face, face model, rigid mask, etc.). A rigid face determination may indicate that the face in the set of images is an artificial face (e.g., is a still photograph of a face, is a rigid mask of a face, is a rigid 3D model of a face, etc.). In a case that the facial motion does not fit (within the fitting threshold, for example), the facial rigidity determiner 116 may determine that the face is a non-rigid face. A non-rigid face determination may indicate that the face is flexible (e.g., may be a live face). In some approaches, the facial rigidity determiner 116 may determine a facial rigidity confidence value. The facial rigidity confidence value may indicate a degree of confidence (e.g., a probability) that the face is rigid (or non-rigid, for example). For example, determining the facial rigidity confidence value may include determining a degree of matching between at least one facial motion and a global model. Additional detail regarding facial rigidity determination is given in connection with FIG. 4. The electronic device 102 may avoid spoofing (e.g., photograph spoofing, rigid model spoofing, rigid 3D model spoofing, rigid mask spoofing, etc.) by determining facial rigidity.

In some approaches, the facial liveness determination and/or authentication determination may be based on only the facial rigidity determination. For example, if the face is determined to be rigid, the face may be determined to be artificial and/or authentication may fail (e.g., may be denied). If the face is determined to be non-rigid, the face may be determined to be a live face and/or authentication may succeed (if the face is also recognized, for example). In other approaches, the facial rigidity determination may be combined with one or more other techniques for determining facial liveness and/or authentication.

The facial liveness determiner 118 may include a screen detector 120 (e.g., display screen detector) in some configurations. Screen detection, as described herein, may refer to detecting a display screen (e.g., liquid crystal display (LCD) screen, organic light emitting diode (OLED) screen, flatscreen display, cathode ray tube (CRT) screen, etc.). The screen detector 120 may determine whether a face is presented on a screen or not (e.g., is a non-screen face). For example, the screen detector 120 may detect spoofing with a screen (e.g., a face displayed on a screen). The screen detector 120 may make the determination for one or more faces. In some configurations, the screen detector 120 may determine temporal differences of the set of image frames. For example, the screen detector 120 may compare different image frames (from different times). For instance, the electronic device 102 may compare one or more aspects (e.g., pixel values, color, intensity, etc.) between image frames at different times. In some approaches, the electronic device 102 may subtract one or more pixel values and/or pixel aspects between frames. Comparing the image frames may produce statistics of the frame differences. For example, some of the temporal differences may indicate a step function (e.g., an abrupt or sharp change in value). The step function(s) may occur due to screen refresh (e.g., updating pixel values). For example, refreshing a screen may cause one or more aspects of the display (e.g., pixel brightness, color, etc.) to exhibit significant temporal differences (e.g., sudden changes). The step function(s) may be observed when the frame rate (e.g., capture frame rate) is greater than twice the screen refresh rate.

The screen detector 120 may determine whether the temporal differences indicate one or more step functions corresponding to one or more screen refreshes. For example, the screen detector 120 may determine whether the temporal differences indicate one or more step functions. For instance, the screen detector 120 may determine whether the temporal differences (e.g., statistics) indicate a threshold number and/or threshold distribution of step functions (e.g., temporal differences greater than a difference threshold). If the screen detector 120 determines that the temporal differences indicate one or more step functions, the screen detector 120 may indicate that the set of images includes a screen. In some approaches, the screen detector 120 may perform screen detection at each location in the set of images where a face is detected. In a case that a face is presented on a screen, the facial liveness determiner 118 may determine that the face is not a live face. Authentication may not be performed based on a face presented on a screen and/or authentication may fail (e.g., may be denied). In some approaches, the screen detector 120 may determine a screen detection confidence value. For example, the screen detector 120 may determine a degree of confidence that the face is presented on a screen. Additional detail regarding screen detection is given in connection with FIG. 3. The electronic device 102 may avoid spoofing (e.g., screen spoofing) by determining temporal differences and/or by performing screen detection.

The processor 112 may include and/or implement a micro-motion determiner 122. The micro-motion determiner 122 may determine one or more facial micro-motions. A facial micro-motion may be a small facial movement. Micro-motions may be small and/or quick to an extent that they may be difficult or impossible for humans to detect in real time. For example, a micro-motion may be a small and/or quick motion of a facial feature (e.g., lips, eyes, eyelids, eyebrows, nose, etc.). Micro-motions may occur in sub-second lengths of time (e.g., within $\frac{1}{15}$th of a second). The micro-motions may be specific sequences of motions in short time intervals. A micro-motion may be represented as a location and/or distance of a facial feature (e.g., feature point, keypoint, corner, etc.) movement over an amount of time (e.g., a number of frames, a time period, etc.). It should be noted that rigidity is a global property of object motion. Micro-motions may include feature-specific motions, for example, near the eyes, near the mouth, etc. Micro-motions may imply non-rigidity in some approaches. Additionally or alternatively, micro-motions may be utilized to distinguish a 3D flexible mask worn by a spoofer from a real person.

The micro-motion determiner 122 may determine one or more facial micro-motions based on the set of image frames. For example, the micro-motion determiner 122 may track one or more facial features (e.g., feature points, keypoints, corners, etc.) over two or more frames. In some configurations, the facial feature tracking may be performed relative to the face (e.g., global facial movement).

In some configurations, the micro-motion determiner 122 may include a micro-expression determiner 124. The micro-expression determiner 124 may determine one or more micro-expressions. The micro-expression(s) may be determined based on the micro-motion(s). A micro-expression may be a pattern of facial feature movement (e.g., movement of one or more facial features). In some approaches, micro-expressions may be associated with an emotion or condition of the subject (e.g., user). For example, a micro-expression may indicate happiness, anger, pain, fear, stress, or duress, etc. In some cases, micro-expressions may happen very quickly, even as fast as within $\frac{1}{30}^{th}$ of a second. In some configurations, micro-motions and/or micro-expressions may be unintentional motions (e.g., sub-conscious motions). For example, micro-motions and/or micro-expressions may not include intentional or deliberate gestures. For instance, micro-motions and/or micro-expressions may not include one or more intentional gestures (e.g., intentional facial motions) for a gesture password.

A person may exhibit certain micro-motions and/or micro-expressions. For example, a particular person may exhibit certain micro-motions. Additionally or alternatively, a particular person may exhibit certain micro-expressions (with a particular emotion or condition, for example).

In some configurations of the systems and methods disclosed herein, the electronic device 102 may obtain training information (e.g., may perform training and/or receive training information from another device) for one or more micro-motions and/or micro-expressions for one or more subjects (e.g., people, users, etc.). For example, the electronic device 102 or another device may perform training prior to utilizing micro-motions and/or micro-expressions in authentication procedures. In some approaches, the electronic device 102 or another device may perform passive capture during everyday activities of the subject. In some approaches, the electronic device 102 may perform a formal training procedure (e.g., request that the user take or provide video of the user's face). Additionally or alternatively, the electronic device 102 may determine one or more emotions and/or conditions associated with the subject's facial movements. For example, the electronic device 102 may analyze subject speech and/or behavior to determine the condition of the subject while capturing a set of training frames.

In some configurations, during training, the electronic device 102 (or another device) may capture high frame rate image frames (e.g., videos) of the subject during regular activities (e.g., everyday activities, during video telephony calls, while taking videos, while using the electronic device 102, etc.). The electronic device 102 may determine (e.g., capture) one or more micro-motions of one or more face locations (e.g., edges of lips, eyes, eyelids, eyebrows, eyebrow shapes, nostrils, etc.). For example, the electronic device 102 may track the motion of one or more face locations in a set of training frames. In some approaches, a micro-motion may be represented as a time sequence of the motions. In some configurations, the electronic device 102 (or another device) may cluster the different micro-motions that occur under regular (e.g., "everyday") activity into different types. For example, the electronic device 102 (or another device) may group captured micro-motions into similar micro-motions for a subject (e.g., person, user, etc.).

In some configurations, one or more micro-motions of one or more face locations may be known to be identifying for micro-expressions. For example, the electronic device 102 may determine one or more patterns of one or more micro-motions as micro-expressions. In some configurations, the micro-expressions may be represented as a micro-motion or a combination of micro-motions. For example, a micro-expression may be a micro-motion of a facial feature (e.g., a time sequence of facial movement) and/or a combination of micro-motions of multiple facial features. The electronic device 102 (or another device) may cluster the different micro-expressions that occur under every day activity into different types. In some configurations, the electronic device 102 (or another device) may associate a condition and/or emotion with each micro-expression.

Training information may include one or more micro-motions, one or more micro-motion clusters, one or more micro-expressions, and/or one or more micro-expression clusters. One or more micro-motions and/or one or more micro-motion clusters corresponding to a particular subject (e.g., user) may be referred to as a micro-motion profile. One or more micro-expressions and/or one or more micro-expression clusters corresponding to a particular subject (e.g., user) may be referred to as a micro-expression profile. In some configurations, the micro-motion profile may indicate micro-motions of a particular subject during regular activities. Additionally or alternatively, the micro-expression profile may indicate micro-expressions of a particular subject during regular activities (with regular emotions, normal emotions, etc.).

During runtime (e.g., authentication) procedures, the micro-motion determiner 122 may determine one or more micro-motions. For example, the electronic device 102 may capture a set of frames at a high frame rate (e.g., 120 FPS, 240 FPS, 480 FPS, etc.) and track one or more facial points (e.g., feature points, keypoints, corners, etc.) in the set of frames.

In some configurations, one or more micro-motions may be utilized to determine liveness of a face. For example, the electronic device 102 (e.g., facial liveness determiner 118, micro-motion determiner 122, authenticator 130, etc.) may compare one or more micro-motions (from runtime, for instance) with one or more micro-motions from the training information (e.g., micro-motion profile). In some configurations, the micro-motion determiner 122 may determine a micro-motion matching confidence value. The micro-motion matching confidence value may indicate a degree of matching between at least one micro-motion (e.g., facial micro-motion) and a micro-motion profile. In some configurations, the electronic device 102 (e.g., facial liveness determiner 118, micro-motion determiner 122, authenticator 130, etc.) may check for outliers (in space and/or in a time sequence) against the regular micro-motions (e.g., micro-motion profile) characteristic of the subject (e.g., user).

In a case that the runtime micro-motion(s) match (within a degree of similarity, for example) the training information micro-motion(s), the electronic device 102 (e.g., facial liveness determiner 118, micro-motion determiner 122, and/or authenticator 130) may determine that the face in the set of frames is a live face of the particular subject (e.g., user). In a case that the runtime micro-motion(s) do not match (within a degree of similarity and/or are outlier(s), for example) the training information micro-motion(s), the electronic device 102 may determine that the face in the set of frames is not a live face of the particular subject (e.g., user). For example, if the runtime micro-motion(s) are outlier(s) in comparison with the training micro-motion(s), the face in the set of frames may be a flexible mask of the particular subject worn by another person and/or may be another person's face. The electronic device 102 may detect and/or avoid spoofing (e.g., flexible mask spoofing, flexible model spoofing, etc.) by determining one or more micro-motions and/or by comparing runtime micro-motion(s) to training micro-motion(s).

In some configurations, the micro-expression determiner 124 may determine one or more micro-expressions (e.g., runtime micro-expressions) based on the runtime micro-motions. For example, the micro-expression determiner 124 may determine one or more patterns of one or more micro-motions as micro-expressions. In some approaches, the electronic device 102 (e.g., micro-expression determiner 124 and/or authenticator 130) may compare the micro-expression(s) with the training information (e.g., micro-expression profile). For example, the electronic device 102 may check for outliers (in space and/or in a time sequence) against the regular micro-expressions characteristic (e.g., micro-expression profile) of the subject (e.g., user). Outliers may indicate that the subject is severely stressed and/or under duress. Authentication (e.g., access) may be denied if the subject is severely stressed and/or under duress. Additionally or alternatively, the electronic device 102 may explicitly check for micro-expressions that are determinant of stress. For example, in a case that the training information includes one or more micro-expressions that indicate severe stress and/or duress, the electronic device 102 may compare the runtime "duress" micro-expression(s) to the "duress" micro-expression(s) from the training information (e.g., micro-expression profile). Some of the approaches described herein may allow detection of someone under duress, or alternately someone using a spoofing mask but having micro-motions different than the actual subject. It should be noted that high frame rates may be utilized to capture micro-motions and/or micro-expressions reliably in some configurations because micro-motions and/or micro-expressions may occur quickly and/or may be spatially small.

In some configurations, the electronic device 102 (e.g., micro-expression determiner 124, authenticator 130, etc.) may additionally or alternatively utilize the micro-expressions to recognize a particular subject (e.g., authorized user). For example, the electronic device 102 may compare the runtime micro-expression(s) with training information micro-expression(s) to determine whether the runtime micro-expression(s) match the training information micro-expression(s) (within a threshold amount or degree, for instance). Micro-expression(s) may be utilized to determine whether a face in the set of image frames exhibits the same (or very similar) micro-expressions to those of a particular subject (e.g., authorized user). The electronic device 102 (e.g., micro-expression determiner 124, authenticator 130, etc.) may determine micro-expression recognition results, which may include a recognition determination and/or a probability or confidence in the recognition determination. In some approaches, the micro-expression determiner 124 may determine a micro-expression matching confidence value. The micro-expression matching confidence value may indicate a degree of matching between at least one micro-expression and a micro-expression profile. The micro-expression recognition results may be utilized in authentication. For example, the authenticator 130 may verify or deny authentication based only on the micro-expression recognition results and/or based on the micro-expression recognition results in combination with one or more other results (e.g., micro-motion analysis results, screen detection analysis results, facial rigidity analysis results, micro-expression duress detection results, background motion analysis results, etc.). For instance, the authenticator 130 may deny authentication in a case that the micro-expression recognition results indicate that the micro-expressions of a face in the set of image frames do not match the micro-expressions of a particular subject (e.g., authorized user). The electronic device 102 may avoid duress spoofing (e.g., forcing a user to authenticate, etc.) by determining one or more micro-expressions and/or by comparing runtime micro-expression(s) to training micro-expression(s).

In some configurations, the electronic device 102 (e.g., processor 112, facial liveness determiner 118, facial rigidity determiner 116, micro-motion determiner 122, micro-expression determiner 124, authenticator 130, etc.) may perform Eulerian magnification. For example, an Eulerian motion magnification component may improve detection of (e.g., magnify) subtle face motions. Eulerian motion magnification may utilize temporal differences (in the set of image frames, for example) and may magnify the temporal differences under different frequency contents. Eulerian motion magnification may be performed relative to one or more fixed pixels. Performing Eulerian motion magnification may be used in motion detection and/or tracking. For example, Eulerian motion magnification may be performed in tracking motion for facial rigidity analysis, for micro-motion analysis, for micro-expression analysis, and/or for background motion analysis. A high frame rate (e.g., ≥120 FPS, ≥240 FPS, ≥480 FPS, ≥960 FPS, etc.) of the set of image frames may improve the reliability of Eulerian motion magnification.

In some configurations, the electronic device 102 (e.g., processor 112, authenticator 130, a global motion determiner, etc.) may analyze background motion (in addition to or alternatively from facial motion, for instance). For example, the electronic device 102 may utilize the set of image frames (e.g., video) to obtain background information. For instance, the electronic device 102 may determine global motion from background information in the set of image frames. In some approaches, the electronic device 102 may track motion at one or more locations (e.g., points, pixels, etc.) between frames (e.g., from frame to frame). The electronic device 102 may determine global motion by determining consistent motion over a portion of the locations. For example, the electronic device 102 may determine global motion as the direction of motion of most of the locations (e.g., points, pixels, etc.) of the frames. Other inconsistent motion may be foreground or object motion.

The background motion and/or global motion may be utilized to detect spoofing. For example, the electronic device 102 may include one or more inertial sensors (e.g., accelerometers, motion sensors, etc.). The electronic device 102 (e.g., processor 112, authenticator 130, etc.) may detect spoofing by checking the consistency of the background (e.g., video) motion with the motion indicated by the inertial sensors. Inconsistent motion may indicate that a face in the set of frames is being presented on a screen or display. In a case that the motion indicated by the inertial sensor(s) and the background motion are inconsistent (e.g., greater than a motion difference threshold), the authenticator 130 may deny authentication in some configurations. In other configurations, the background motion analysis results (e.g., the background motion determination and/or a probability or confidence thereof) may be combined with one or more other results to determine whether to verify or deny authentication. In some approaches, background motion analysis may be performed as part of or in conjunction with screen detection analysis.

The processor 112 may include and/or implement an authenticator 130. The authenticator 130 may perform authentication for one or more subjects (e.g., users). In some configurations, the authenticator 130 may perform facial recognition based on the set of image frames. For example, the authenticator 130 may compare one or more faces (e.g., feature point structure, feature vectors, facial characteristics, etc.) in the set of image frames to authorized face information (e.g., feature point structure, feature vectors, facial characteristics, etc., of one or more authorized faces). In other configurations, facial recognition may be performed by a separate element implemented in the processor 112 or in a separate chip. The authorized face information may be predetermined and/or stored in the memory 126. For example, the electronic device 102 may perform one or more facial authentication setup procedures where the electronic device 102 obtains (e.g., captures, receives, etc.) the authorized face information.

The authenticator 130 may determine whether the set of image frames includes a face of an authorized subject (e.g., user). The authenticator 130 may perform authentication based on one or more conditions. For example, the authenticator 130 may verify authentication (e.g., allow access, verify an authorized subject, etc.) for a recognized authorized face that is also a live face and/or that is not under duress. For instance, the authenticator 130 may perform authentication based on a combination of facial recognition and/or one or more of the spoofing avoidance techniques described herein. In some approaches, the authenticator 130 may perform authentication based on the facial rigidity analysis, screen detection analysis, micro-motion analysis, micro-expression analysis, background motion analysis, and/or a combination of two or more thereof.

In some configurations, the authenticator 130 may perform authentication based on a facial liveness determination. For example, the authenticator 130 may verify authentication for a recognized authorized face that is also a live face (as determined based on facial rigidity, screen detection, and/or micro-motion, or a combination thereof, for example) that is recognized as being authorized. For instance, if a face in the set of images is recognized as being an authorized subject and it is determined that the face is a live face, the authenticator 130 may verify authentication. Otherwise, the authenticator 130 may deny authentication. Additionally or alternatively, the authenticator 130 may verify authentication for a recognized authorized face that is also not under duress. Otherwise, the authenticator 130 may deny authentication.

In some approaches, the authenticator 130 may authenticate (e.g., authenticate a user) based on one or more confidence values. For example, the authenticator 130 may authenticate based on a screen detection confidence value, a facial rigidity confidence value, a micro-motion matching confidence value, and/or a micro-expression matching confidence value. For instance, the authenticator 130 may apply thresholds to two or more corresponding confidence values. If a threshold rule is met (e.g., all of the confidence values satisfy corresponding thresholds, a number (e.g., ¾, ⅔, ⅔, ½, etc.) of confidence values satisfy corresponding thresholds, etc.), the authenticator 130 may verify authentication. Otherwise, the authenticator 130 may deny authentication. In some approaches, the authenticator 130 may combine two or more confidence values to determine an overall confidence value. For example, the authenticator 130 may determine an overall confidence value indicating a degree of confidence whether a face in the set of images is a target face (e.g., recognized, authorized, live, not spoofed, etc.). The authenticator 130 may verify authentication if the overall confidence value is greater than a threshold.

In some configurations of the systems and methods disclosed herein, authentication may be performed on a discrete basis and/or on a continuous basis. For example, the electronic device 102 may continually capture sets (e.g., high-rate bursts) of image frames while the electronic device 102 is in use. This may enable authentication procedures to be performed repeatedly and/or continuously. For example, a device may be configured to continuously perform authentication. If a threshold time period passes without authentication being verified, access may be denied.

Some configurations of the systems and methods disclosed herein may offer passive authentication. For example, a subject (e.g., user) may not need to perform affirmative steps (e.g., pushing a button, making a gesture, providing a command, etc.) for performing authentication (besides using a device and/or entering a device's field of view for example). In other approaches, active authentication may be performed. For example, a user may trigger authentication procedures (by pushing a button, making a gesture, tapping a touch screen, saying a command, etc., for instance).

Verifying or denying authentication may be utilized in many different contexts. For example, the spoof-hardened facial recognition based authentication described herein may grant access (e.g., unlock a smart phone, perform a profile login, unlock a door to a secure building/area, allow access to confidential information, allow access to a vehicle, enable autonomous driving, etc.) in a case that authentication is verified. In a case that authentication is denied, the spoof-hardened facial recognition based authentication described herein may deny access (e.g., not unlock a smart phone, deny a profile login, maintain a door lock to a secure building/area, deny access to confidential information, deny access to a vehicle, disable autonomous driving, etc.).

It should be noted that one or more of the elements or components of the electronic device 102 may be combined and/or divided. For example, one or more of the image obtainer 114, the facial liveness determiner 118, the facial rigidity determiner 116, the screen detector 120, the micro-motion determiner 122, the micro-expression determiner 124, and/or the authenticator 130 may be combined. Additionally or alternatively, one or more of the image obtainer 114, the facial liveness determiner 118, the facial rigidity determiner 116, the screen detector 120, the micro-motion determiner 122, the micro-expression determiner 124, and/or the authenticator 130 may be divided into elements or components that perform a subset of the operations thereof.

Figure 2:
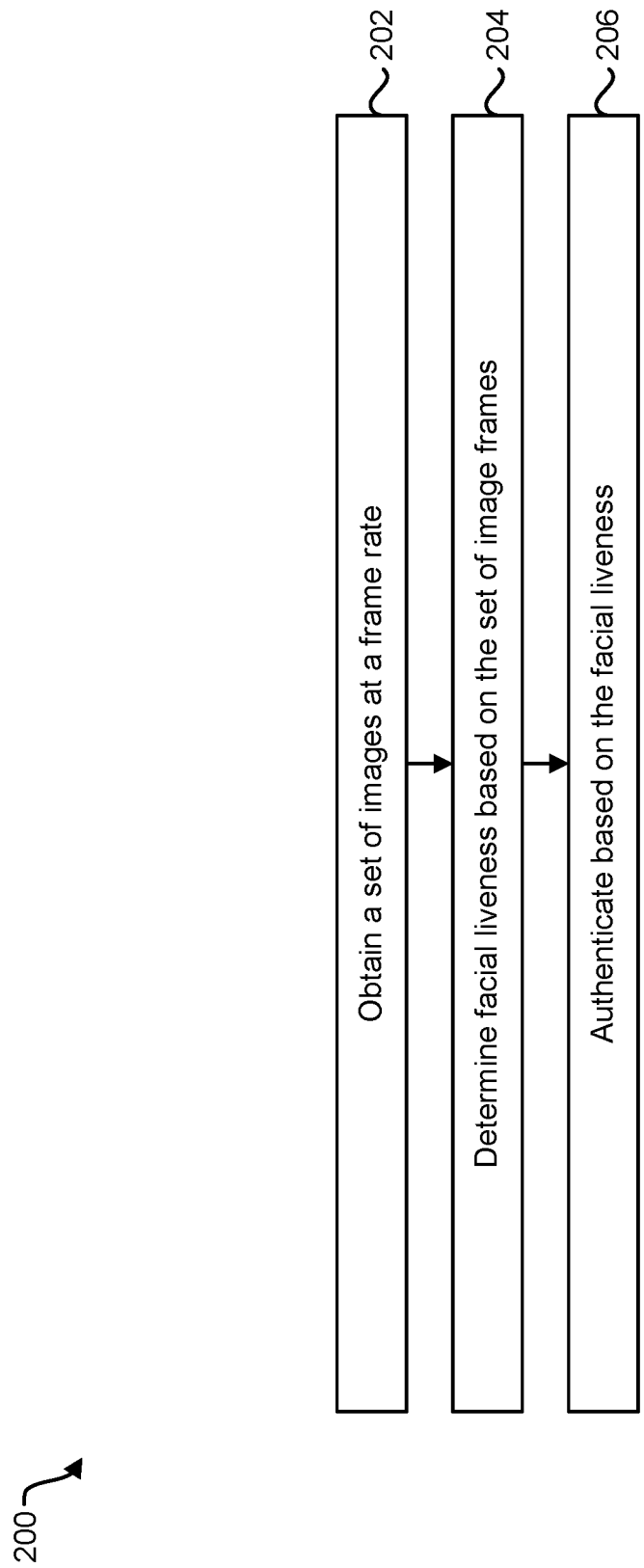
FIG. 2 is a flow diagram illustrating one configuration of a method for facial authentication.

FIG. 2 is a flow diagram illustrating one configuration of a method 200 for facial authentication. The method 200 may be performed by the electronic device 102, for example. The electronic device 102 may obtain 202 a set of images. This may be accomplished as described in relation to FIG. 1. For example, the electronic device 102 may obtain 202 a set of image frames (e.g., video) captured at a frame rate of at least 120 FPS. The set of images may include a face. Obtaining 202 may include receiving the set of image frames (from an image sensor included in the electronic device 102 or from a remote device (e.g., camera), for example). In some configurations, the set of images (e.g., image frames) may be captured upon switching to a higher capture rate.

The electronic device 102 may determine 204 facial liveness based on the set of image frames. This may be accomplished as described in relation to FIG. 1. For example, the electronic device 102 may determine facial rigidity of the face in the set of image frames, may determine whether the face is presented on a screen, and/or may determine whether one or more micro-motions (and/or micro-expressions) indicate liveness. In some configurations, determining 204 facial liveness may include determining one or more confidence values (e.g., screen detection confidence value, facial rigidity confidence value, micro-motion matching confidence value, and/or micro-expression matching confidence value, etc.).

The electronic device 102 may authenticate 206 based on the facial liveness. This may be accomplished as described in relation to FIG. 1. For example, the electronic device 102 may authenticate 206 a user. For instance, the electronic device 102 verify authentication for a recognized authorized face that is also determined to be a live face. Additionally or alternatively, if a face is presented on a screen, is rigid, and/or has an un-matching micro-motion (and/or micro-expression), the electronic device 102 may deny authentication. In some configurations, the electronic device 102 may authenticate 206 (e.g., authenticate a user) based on one or more confidence values (e.g., a combination of confidence values, an overall confidence value, etc.).

Figure 3:
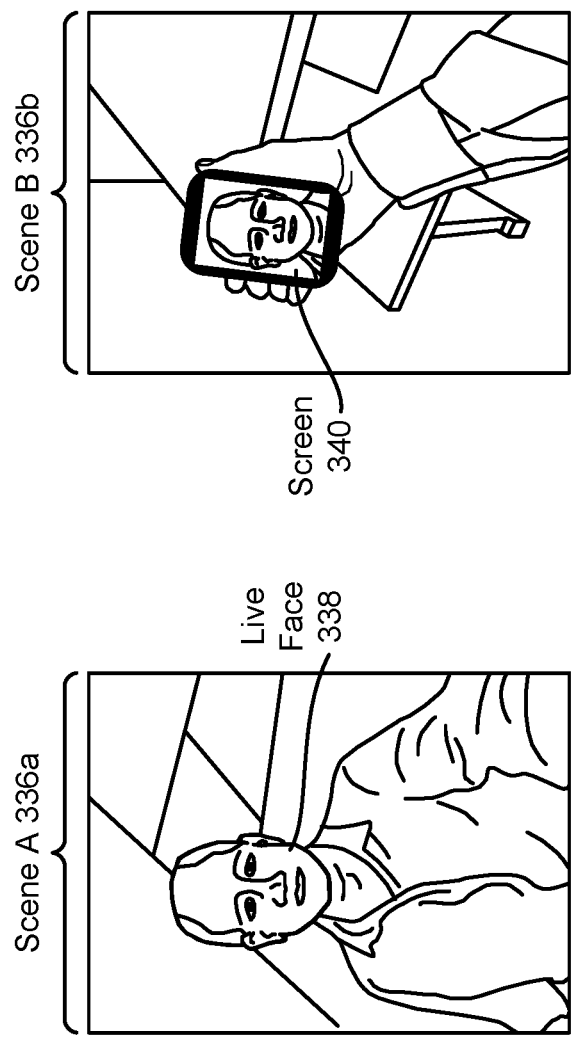
FIG. 3 is a diagram illustrating examples of scenes with a live face and a screen.

FIG. 3 is a diagram illustrating examples of scenes 336a-b with a live face 338 and a screen 340. Some configurations of the systems and methods disclosed herein may distinguish a screen (e.g., display) from a natural scene (e.g., non-screen) based on a set of image frames (e.g., high frame rate captured video). For example, some configurations of the systems and methods disclosed herein may determine facial liveness based on determining whether a face is presented on a screen 340 or not (e.g., is a live face 338).

A scene may include one or more image frames (e.g., a set of image frames captured at a frame rate). For example, a scene may include a series of image frames (e.g., video). Scene A 336a includes a live face 338 as illustrated in FIG. 3. A scene that includes a live face may be referred to as a "live scene." Scene B 336b does not include a live face, but includes a screen 340 (e.g., smart phone display) that depicts a face.

The electronic device 102 may determine temporal differences of a set of image frames. For example, the electronic device 102 may compute temporal differences between frames in the set of image frames. For instance, the electronic device 102 may compare one or more aspects (e.g., pixel values, color, intensity, etc.) between image frames at different times. In some approaches, the electronic device 102 may subtract one or more pixel values and/or pixel aspects between frames.

The electronic device 102 may examine the statistics of the frame differences. For some displays (e.g., artificial displays, LCD displays, organic light emitting diode (OLED) displays, etc.), the frame differences may indicate step function changes each time the display information is refreshed (at regular intervals, for example). For natural scenes, there will not be the artificial step function changes in the differences.

One or more approaches may be implemented in order to detect a screen (e.g., artificial face) versus a natural scene (e.g., natural face, live face, etc.). The electronic device 102 may process the frame difference information to detect a screen 340 (e.g., artificial display) versus a live scene (e.g., natural scene, live face 338, etc.). Frequency-domain processing and/or time-domain processing may be performed in order to determine whether a face is presented on a screen or is a live face. For example, the electronic device 102 may examine frequency content of the frame differences at typical refresh rates. Additionally or alternatively, the electronic device 102 may examine (in the time domain, for example) for an outlier in frame differences at typical refresh rates.

Screen detection may be utilized to avoid spoofing by photographs or even video on a tablet or smart phone display. For example, in a case that a screen 340 is utilized in an attempt to spoof authentication, the electronic device 102 may detect the screen 340 and avoid authenticating based on the screen 340 image (e.g., the artificial face).

In some configurations, the frame rate of the set of image frames (e.g., high frame rate) may need to be sufficiently high to capture the refresh rate of the display. Having a sufficient frame rate may be useful for video spoofing (from a display, smart phone, tablet, etc.). For example, the capture rate of regular frame rate video may not be able to capture the step functions at the display refresh rate. In some approaches, the frame rate (e.g., capture frame rate) of the set of images may be greater than a display refresh rate (e.g., a display refresh rate of a display used for spoofing). For example, many devices (e.g., smart phones, tablets) have a refresh rate of 60 hertz (Hz) or less. In some configurations, the frame rate (e.g., capture frame rate) of the set of images may be greater than or equal to 120 FPS (or Hz). Some displays may have higher refresh rates (e.g., 120 Hz). Accordingly, the frame rate may be greater than or equal to 240 FPS in some configurations. Having a higher frame rate relative to likely spoofing display refresh rates may enable a deterministic approach to detecting screens. Other approaches having a frame rate that is the same or less than a display refresh rate may not be able to reliably detect screens. For example, using a capture frame rate of 60 FPS when a display refresh rate is 60 Hz may not indicate the temporal differences (e.g., step functions) that are observable with higher frame rates. Accordingly, sampling at the same rate as a display rate and/or sub-sampling (e.g., sampling at a lower rate, randomly selecting frames at a lower rate, etc.) may not provide a reliable approach in detecting screens.

It should be noted that a "live scene" may include one or more screens in addition to one or more lives faces in some cases and/or configurations. For example, a scene may include a live face in addition to one or more screens. One or more approaches may be implemented to address these scenarios in some configurations of the systems and methods disclosed herein.

In some approaches, the electronic device 102 may perform face detection on the set of image frames. The face detection may indicate one or more regions (e.g., regions of interest (ROIs), bounding boxes, etc.) where one or more faces (e.g., one or more live faces and/or one or more artificial faces) are located. The electronic device 102 may perform screen detection as described herein on each of the regions. The electronic device 102 may ignore each of the regions where a screen is detected (for purposes of authentication). If no live face is detected, then authentication may not be performed for that region and/or authentication (e.g., access based on the authentication) may be denied. If one or more non-screen regions (e.g., live faces) are detected, authentication (e.g., facial recognition, micro-motion analysis, and/or micro-expression analysis, etc.) may be performed based on one or more of the non-screen regions.

In some approaches, if any screen is detected (and/or any screen with a face) in a set of image frames (e.g., scene), the electronic device 102 may not perform authentication and/or authentication (e.g., access based on the authentication) may be denied. Additionally or alternatively, if any screen is detected (and/or any screen with a face) in a set of image frames (e.g., scene), the electronic device 102 may provide (e.g., output audio speech with, display, etc.) a message indicating that any screen(s) need to be removed from the scene (e.g., field of view) to perform authentication.

Figure 4:
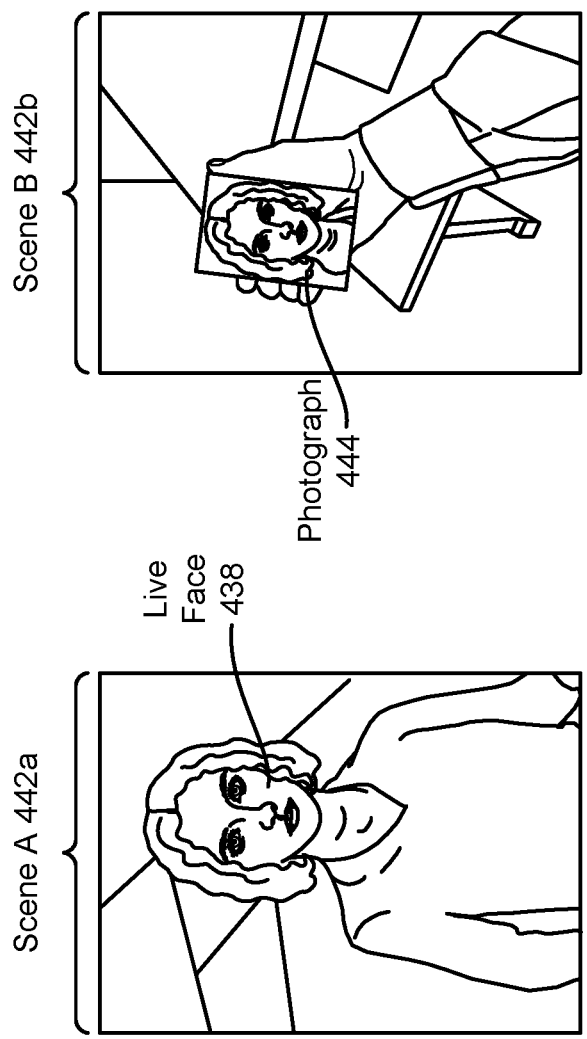
FIG. 4 is a diagram illustrating examples of scenes with a live face 438 and a photograph.

FIG. 4 is a diagram illustrating examples of scenes 442a-b with a live face 438 and a photograph 444. Some configurations of the systems and methods disclosed herein may distinguish a rigid artificial face (e.g., photograph, rigid mask, 3D bust, statue, still photograph on a display, etc.) from a live face based on a set of image frames (e.g., high frame rate captured video). Scene A 442a (e.g., a "live scene") includes a live face 438 as illustrated in FIG. 4. Scene B 442b does not include a live face, but includes a photograph 444 that depicts a face.

In order to distinguish a rigid artificial face from a live face, the electronic device 102 may detect rigid motion versus non-rigid motion. For example, motions of a rigid mask or photograph of someone may be "rigid." For instance, a rigid artificial face may move (e.g., translate, rotate, etc.), but relative locations of and/or relative distances between points on the rigid artificial face may remain approximately static. A live face may exhibit more motion flexibility between points on the face (e.g., varying relative locations of and/or relative distances between points on the face).

The electronic device 102 may utilize motion estimation to distinguish natural face motion from motion of a rigid artificial face (e.g., rigid mask, a photograph, etc.). The electronic device 102 may perform one or more functions (e.g., steps) in order to distinguish live face motion from rigid artificial face motion.

The electronic device 102 may estimate local motion at selected points (e.g., feature points, keypoints, corners, etc.) of a face. The electronic device 102 may use the local motion to fit a rigid global motion model (e.g., to fit the best (projected) rigid global motion model). The electronic device 102 may determine whether the face is a live face or a rigid artificial face based on a degree to which the local motion fits the global motion model. For example, the goodness of the fit to the global motion may determine whether a face is a live face versus a rigid artificial face (e.g., a rigid mask, a photograph, a 3D bust, etc.). For instance, if the local motion fits the global motion (within a fitting threshold, for example), the face may be determined to be rigid (e.g., non-live face). If the local motion does not fit the global motion (e.g., beyond the fitting threshold, for example), the face may be determined to be non-rigid (e.g., a flexible face).

It may be possible to determine rigidity at some lower frame rates (e.g., 30 FPS, 60 FPS). Determining rigidity at higher frame rates (e.g., 120 FPS, 240 FPS, etc.) may provide one or more benefits. With high frame rate video, for example, the electronic device 102 may be able to track changes through time (quickly) and determine (e.g., zero in, focus in, etc.) on one or more regions with high outliers from global motion such as lips, eyes, etc. A reduced amount of motion in high frame rate images (e.g., video) may allow a significant reduction in rolling shutter shear during high object motion. Rolling shutter shear at lower frame rates may cause more difficulty in distinguishing rigid motion from non-rigid motion. Higher frame rates (e.g., 120 FPS, 240 FPS, etc.) may allow for cheaper computations due to needing smaller search windows. Additionally or alternatively, higher frame rates (e.g., 120 FPS, 240 FPS, etc.) may allow for more robust tracking of non-rigid motions at lips, eyes, etc.

Figure 5:
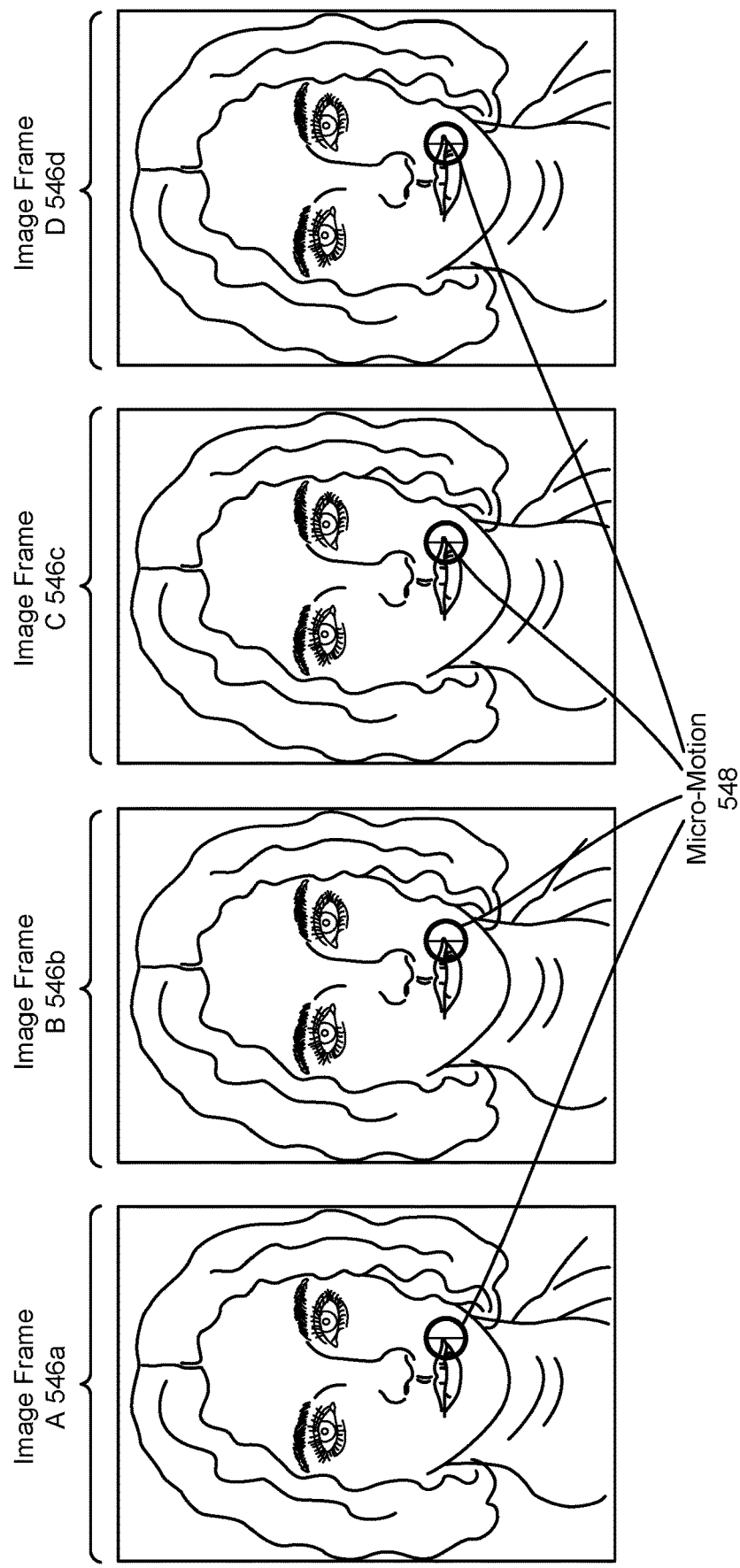
FIG. 5 is a diagram illustrating an example of a micro-motion.

FIG. 5 is a diagram illustrating an example of a micro-motion 548. In some configurations of the systems and methods disclosed herein, the electronic device 102 may detect one or more micro-motions and/or one or more micro-expressions. As illustrated in FIG. 5, the micro-motion 548 may be a small motion over a number of image frames 546a-d. In the example illustrated in FIG. 5, the lip corner shifts slightly over image frames A-D 546a-d.

Figure 6:
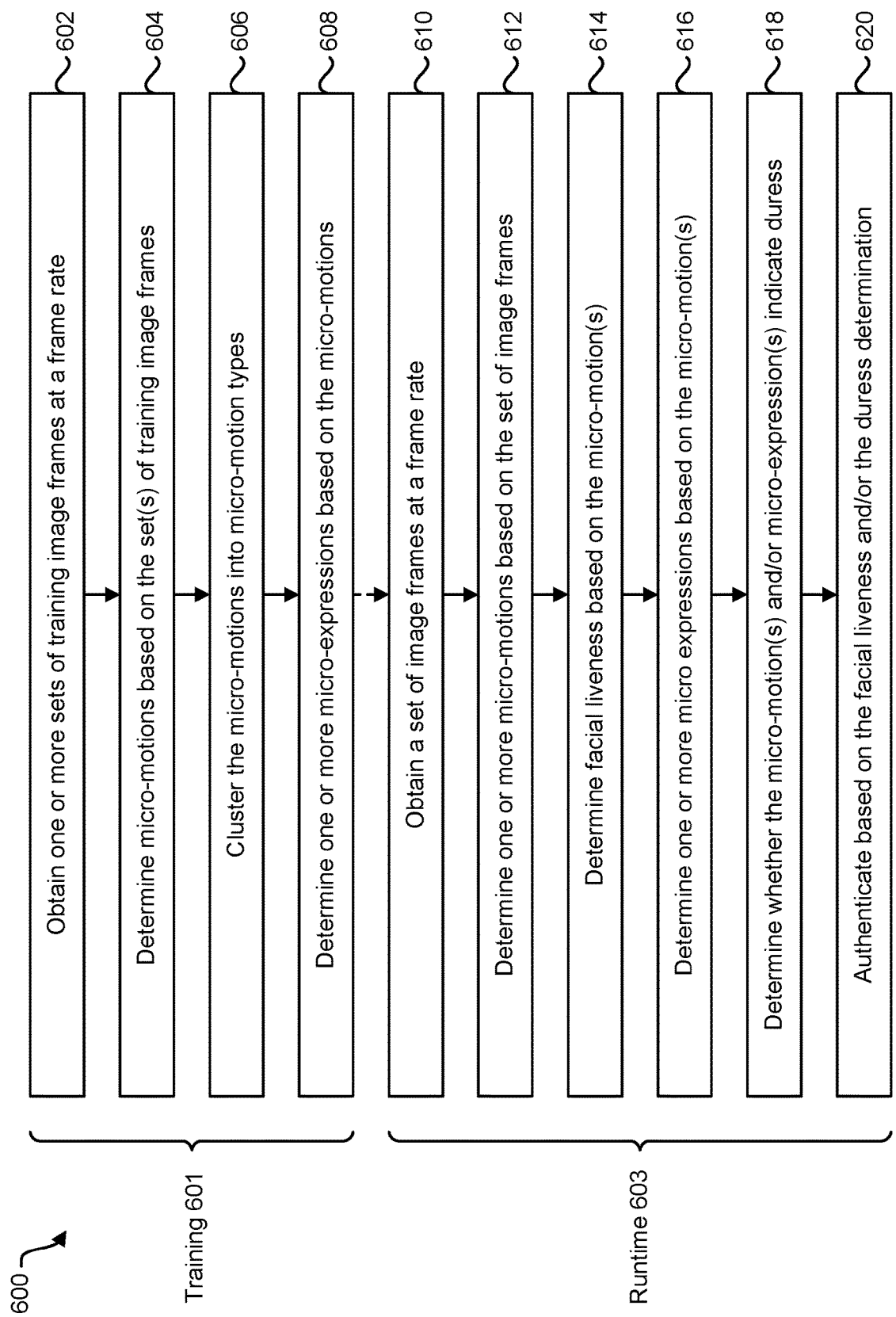
FIG. 6 is a flow diagram illustrating another configuration of a method for facial authentication.

FIG. 6 is a flow diagram illustrating another configuration of a method 600 for facial authentication. One or more steps of the method 600 may be performed by the electronic device 102, for example. As illustrated in FIG. 6, one or more steps may be performed during training 601 and one or more steps may be performed during runtime 603. It should be noted that the method 600 may be divided into separate methods and/or may be performed by one or more devices. For example, one or more steps during training 601 may be performed by one device and one or more steps during runtime 603 may be performed by another device.

The electronic device 102 may obtain 602 one or more sets of training image frames at a frame rate. This may be accomplished as described in relation to FIG. 1. For example, the electronic device 102 may obtain a set of image frames (e.g., video) captured at a frame rate of at least 120 FPS. The set of image frames may include a face. The training image frames may be obtained during a formal training procedure and/or during one or more other activities (e.g., while a subject is using a smart phone, making a video telephony call, etc.).

The electronic device 102 may determine 604 one or more micro-motions based on the set(s) of training image frames. This may be accomplished as described in relation to FIG. 1. For example, the electronic device 102 may determine one or more facial micro-motions in the set of training image frames. For instance, the electronic device 102 may track one or more facial features (e.g., feature points, keypoints, corners, etc.) over one or more sets of training image frames. In some configurations, the micro-motion(s) may be clustered. The micro-motion(s) may be stored as a micro-motion profile for a particular subject.

The electronic device 102 may cluster 606 the micro-motions into micro-motion types. This may be accomplished as described in relation to FIG. 1. For example, the electronic device 102 may group captured micro-motions into similar micro-motions for a subject (e.g., person, user, etc.). The clustered micro-motions may be all or part of a micro-motion profile.

The electronic device 102 may determine 608 one or more micro-expressions based on the micro-motions. This may be accomplished as described in relation to FIG. 1. For example, the electronic device 102 may determine patterns of micro-motions and/or may determine one or more emotions and/or conditions associated with the micro-motions. In some approaches, the electronic device 102 may classify the micro-motion pattern(s) as micro-expression(s) based on one or more micro-expression templates that may indicate general patterns for micro-expression(s). In some configurations, the micro-expression(s) may be clustered. The micro-expression(s) may be stored as a micro-expression profile for a particular subject.

During runtime, the electronic device 102 may obtain 610 a set of image frames at a frame rate. This may be accomplished as described in relation to FIG. 1. For example, the electronic device 102 may obtain a set of image frames (e.g., video) captured at a frame rate of at least 120 FPS. The set of images may include a face.

The electronic device 102 may determine 612 one or more micro-motions based on the set image frames. This may be accomplished as described in relation to FIG. 1. For example, the electronic device 102 may determine one or more facial micro-motions in the set of image frames. For instance, the electronic device 102 may track one or more facial features (e.g., feature points, keypoints, corners, etc.) over one or more sets of training frames.

The electronic device 102 may determine 616 one or more micro-expressions based on the micro-motions. This may be accomplished as described in relation to FIG. 1. For example, the electronic device 102 may determine patterns of micro-motions and/or may determine one or more emotions and/or conditions associated with the micro-motions.

The electronic device 102 may determine 614 facial liveness based on the micro-motion(s). This may be accomplished as described in relation to FIG. 1. For example, the electronic device 102 may determine whether the micro-motion(s) match the micro-motion profile (within a degree of similarity, for instance). If the micro-motion(s) match, the electronic device 102 may determine that the face is a live face (of a particular person, of the subject, for example).

The electronic device 102 may determine 616 one or more micro-expressions based on the micro-motion(s). This may be accomplished as described in relation to FIG. 1. For example, the electronic device 102 may determine patterns of micro-motions and/or may determine one or more emotions and/or conditions associated with the micro-motions.

The electronic device 102 may determine 618 whether the micro-motion(s) and/or micro-expression(s) indicate duress. This may be accomplished as described in relation to FIG. 1. For example, the electronic device 102 may determine whether the micro-motion(s) indicate an outlier compared to the micro-motion profile. Additionally or alternatively, the electronic device 102 may determine whether the micro-expression(s) indicate duress (e.g., match with duress or severe stress micro-expression(s) of the micro-expression profile).

The electronic device 102 may authenticate 620 based on the facial liveness and/or duress determinations. This may be accomplished as described in relation to FIG. 1. For example, the electronic device 102 verify authentication for a recognized authorized face that is also determined to be a live face that is not under duress. Additionally or alternatively, if a face has an un-matching micro-motion (e.g., an un-matched outlier) and/or if the micro-expression(s) indicate duress, the electronic device 102 may deny authentication.

It should be noted that one or more of the steps described in FIG. 6 may be optional and/or may not be performed in some configurations. For example, micro-expression(s) may not be determined and/or may not factor into authentication in some configurations.

Figure 7:
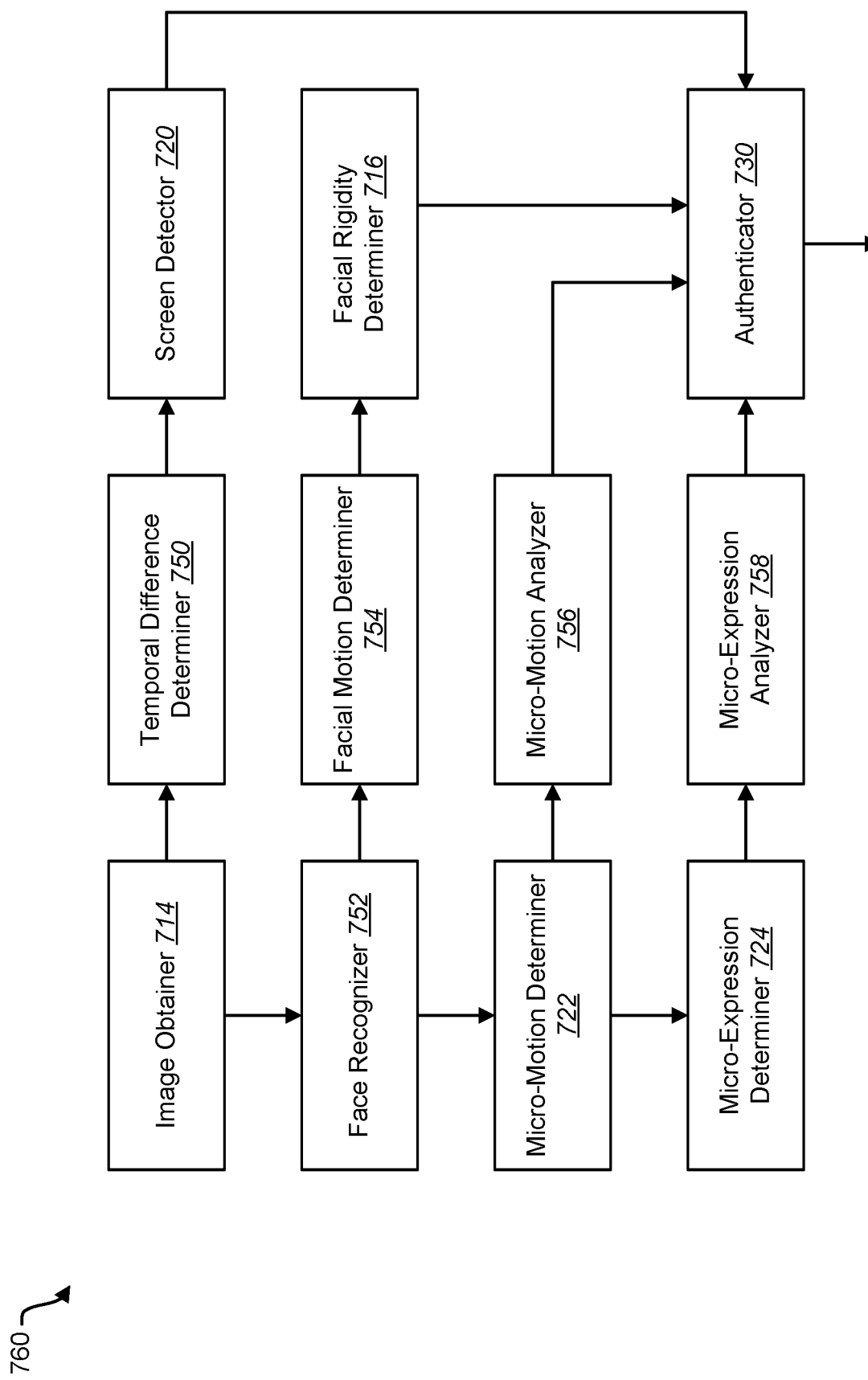
FIG. 7 is a block diagram illustrating an example of one or more components or elements that may be implemented in accordance with some configurations of the systems and methods disclosed herein.

FIG. 7 is a block diagram illustrating an example of one or more components or elements 760 that may be implemented in accordance with some configurations of the systems and methods disclosed herein. In particular, FIG. 7 illustrates examples of an image obtainer 714, a temporal difference determiner 750, a screen detector 720, a face recognizer 752, a facial motion determiner 754, a facial rigidity determiner 716, a micro-motion determiner 722, a micro-motion analyzer 756, a micro-expression determiner 724, a micro-expression analyzer 758, and an authenticator 730. In some configurations, one or more of the components or elements 760 described in connection with FIG. 7 may be implemented in the electronic device 102 described in connection with FIG. 1 (e.g., in the processor 112 and/or in a separate processor or other component or element). In some configurations, one or more of the components or elements 760 described in connection with FIG. 7 may be examples of corresponding components or elements described in connection with FIG. 1. For instance, the image obtainer 714, screen detector 720, facial rigidity determiner 716, micro-motion determiner 722, micro-expression determiner 724, and/or authenticator 730 may be examples of, and/or may operate as described in connection with, corresponding components or elements described in connection with FIG. 1.

The image obtainer 714 may obtain image frames as described in connection with FIG. 1. For instance, the image obtainer 714 may receive image data from one or more image sensors and/or from one or more remote devices. In some configurations, the image obtainer 714 may obtain a set of image frames (e.g., high speed video) captured at a frame rate (e.g., ≥120 FPS, ≥240 FPS, ≥480 FPS, etc.). The set of images (e.g., video) may include one or more faces. The image obtainer 714 may provide the set of image frames (e.g., video) to one or more components or elements. For example, the image obtainer 714 may provide the set of image frames to the face recognizer 752 and to the temporal difference determiner 750.

The temporal difference determiner 750 may determine (e.g., extract) one or more temporal differences of the set of image frames. This may be accomplished as described in connection with FIG. 1. For example, the temporal difference determiner 750 may compare different image frames (from different times) to determine one or more temporal differences (e.g., temporal difference values, statistics, etc.). The temporal difference(s) may be provided to the screen detector 720.

The screen detector 720 may determine whether the set of image frames (and/or one or more regions of the set of image frames) includes (e.g., depicts) a screen. This may be accomplished as described in connection with FIG. 1. In some approaches, the screen detector 720 may examine temporal patterns to determine whether the set of image frames indicate a screen or a live scene. For example, the screen detector 720 may determine whether one or more step functions are indicated by the temporal difference(s). In some approaches, the screen detector 720 may examine frequency content (e.g., a frequency-domain transform) of the frame differences (e.g., temporal differences) at one or more refresh rates (e.g., 30 Hz, 60 Hz, 120 Hz, etc.) to determine whether step function(s) are indicated. For example, the screen detector 720 may perform a frequency-domain transform of the frame differences and/or determine whether the frequency domain content (e.g., energy) at one or more refresh rates is greater than a threshold. Step functions occurring at one or more refresh rates may indicate that that the set of image frames includes a screen (e.g., a face presented on a display). The screen detection results may be provided to the authenticator 730. In some approaches, the screen detection results may indicate whether a screen is detected in the set of image frames. Additionally or alternatively, the screen detection results may indicate a probability or a certainty of whether a screen is detected (e.g., a screen detection confidence value). Additionally or alternatively, the screen detection results may indicate one or more regions (e.g., regions of interest (ROIs), bounding boxes, etc.) where screens may be detected and/or corresponding probabilities or certainties of screen detection.

The set of image frames may be provided to the face recognizer 752. The face recognizer 752 may perform facial recognition based on the set of image frames. For example, the face recognizer 752 may determine whether one or more faces included in the set of image frames corresponds to a known (e.g., authorized) face. For instance, the face recognizer 752 may compare a face in the set of image frames to a known (e.g., stored) facial profile. The facial profile may include and/or indicate one or more characteristics of a person's face. For example, the facial profile may indicate one or more features (e.g., feature points, keypoints, corners, feature vectors, facial structure, distances between feature points, facial shape, eye color, skin color, feature size, etc.) that characterize a person's (e.g., subject's, user's, authorized user's, etc.) face. The face recognizer 752 may extract one or more features of a face in the set of images and compare the extracted features to the features of the facial profile. The face recognizer 752 may determine whether the extracted features match the features of the facial profile and/or a degree to which the extracted features match the facial profile features. In some approaches, a face in the set of image frames may be considered a match in a case that the extracted features match the facial profile features within a matching threshold. The facial recognition results may be provided to the facial motion determiner 754, the micro-motion determiner 722, and/or the authenticator 730. The facial recognition results may indicate whether a face is recognized, a probability or confidence in the match (e.g., a facial recognition confidence value), and/or one or more regions in the set of image frames where the face is recognized (or faces are recognized).

The set of image frames and/or the facial recognition results may be provided to the facial motion determiner 754. The facial motion determiner 754 may estimate one or more facial motions. The facial motions may be determined based on one or more facial features. For example, the facial motion determiner 754 may track one or more facial features (e.g., feature points, keypoints, corners, etc.) over a subset of or all of the set of image frames. The tracked facial features may be local features. For example, the facial motion determiner 754 may estimate the motion of one or more feature points (corresponding to facial structures such as lip edges, eye corners, eyebrows, etc., for instance) over a subset of or all of the set of image frames (within one or more local regions and/or in whole frames, for example). The facial motion results (e.g., tracked facial feature data) may be provided to the facial rigidity determiner 716.

The facial rigidity determiner 716 may determine a facial rigidity of the face in the set of image frames. For example, the facial rigidity determiner 716 may examine whether motions are non-rigid to determine subject liveness. In particular, the facial rigidity determiner 716 may determine whether the one or more facial motions are rigid or non-rigid (e.g., flexible). For example, the facial rigidity determiner 716 may determine a global motion model based on the one or more facial motions. For instance, the facial rigidity determiner 716 may determine a rigid transform of the facial features (e.g., feature points, keypoints, corners, etc.) between frames (e.g., from an initial frame to a later frame).

In a case that the facial motion fits the global model (within a fitting threshold, for example), the facial rigidity determiner 716 may determine that the face is a rigid face. A rigid face determination may indicate that the face in the set of images is an artificial face (e.g., is a still photograph of a face, is a rigid mask of a face, is a rigid 3D model of a face, etc.). In a case that the facial motion does not fit (within the fitting threshold, for example), the facial rigidity determiner 716 may determine that the face is a non-rigid face. A non-rigid face determination may indicate that the face is flexible (e.g., may be a live face). In some approaches, the facial rigidity determiner 716 may determine a facial rigidity confidence value. The facial rigidity confidence value may indicate a degree of confidence that the face is rigid (or non-rigid). For example, the facial rigidity determiner 716 may determine a probability or confidence that a face is a rigid face (or a flexible face). For example, the more closely the facial motion matches (e.g., aligns with) the global model, the higher the probability or confidence that the face is a rigid face. The looser the match (e.g., the larger the distance between the facial motion and the global model for one or more features), the lower the probability or confidence that the face is a rigid face. The rigidity determination and/or the probability or confidence (e.g., facial rigidity confidence value) may be provided to the authenticator 730.

The micro-motion determiner 722 may determine (e.g., extract) one or more facial micro-motions based on the set of image frames. For example, the micro-motion determiner 722 may track one or more facial features (e.g., feature points, keypoints, corners, etc.) over two or more image frames. In some configurations, the facial feature tracking may be performed relative to the face (e.g., global facial movement). A micro-motion may be represented as a location and/or distance of a facial feature (e.g., feature point, keypoint, corner, etc.) movement over an amount of time (e.g., a number of frames, a time period, etc.). The micro-motions (e.g., micro-motion data) may be provided to the micro-motion analyzer 756 and/or to the micro-expression determiner 724. It should be noted that micro-motions may be local facial motions that occur fairly quickly (e.g., within a time period such as ≤0.5 seconds (s), ≤1 s, ≤1.5 s, etc.). Facial motion for determining "non-rigidity," for instance, may happen more slowly in some cases. For example, a user scrunching his or her face slowly may indicate non-rigidity and/or liveness (e.g., may be detected as a non-rigid face), but may not necessarily qualify as a micro-motion (for identifying micro-motion, for instance).

In some configurations, the micro-motion analyzer 756 may utilize one or more micro-motions to determine liveness of a face (e.g., a face for a particular subject or user). For example, the micro-motion analyzer 756 may compare one or more micro-motions (from runtime, for instance) with one or more micro-motions from training information (e.g., a micro-motion profile). In some configurations, the micro-motion analyzer 756 may check for outliers (in space and/or in a time sequence) against the regular micro-motions (e.g., micro-motion profile) characteristic of the subject or user.

In a case that the runtime micro-motion(s) match (within a degree of similarity, for example) the training information micro-motion(s), the micro-motion analyzer 756 may determine that the face in the set of frames is a live face of the particular subject (e.g., user). In a case that the runtime micro-motion(s) do not match (within a degree of similarity and/or are outlier(s), for example) the training information micro-motion(s), the micro-motion analyzer 756 may determine that the face in the set of frames is not a live face of the particular subject (e.g., user). For example, if the runtime micro-motion(s) are outlier(s) in comparison with the training micro-motion(s), the face in the set of frames may be a flexible mask of the particular subject worn by another person and/or may be another person's face. In some approaches, the micro-motion analyzer 756 may detect one or more (micro-motion) outliers as one or more micro-motions that are outside of a threshold from a model micro-motion (e.g., micro-motion cluster, micro-motion average, etc.). For example, if a micro-motion is outside of a standard deviation (or two standard deviations, or some other distance from a mean, etc.), the micro-motion may be an outlier.

In some approaches, the micro-motion analyzer 756 may determine a micro-motion matching confidence value. The micro-motion matching confidence value may indicate a degree of matching between at least one facial micro-motion and a micro-motion profile. For example, micro-motion analyzer 756 may determine a probability or confidence of a micro-motion match between the runtime micro-motion(s) and the training information micro-motion(s). For example, the more closely the runtime micro-motion(s) match the training information micro-motion(s) (e.g., micro-motion cluster, micro-motion mean, etc.), the higher the probability or confidence that the face is a live face of the particular subject (e.g., authorized user). The looser the match (e.g., the larger the differences the runtime micro-motion(s) and the training information micro-motion(s)), the lower the probability or confidence that the face is a live face of the particular subject (e.g., authorized user). The live face determination and/or the probability or confidence (e.g., micro-motion matching confidence value) may be provided to the authenticator 730.

The micro-expression determiner 724 may determine (e.g., extract) one or more micro-expressions. For example, the micro-expression determiner 724 may determine one or more micro-expressions (e.g., runtime micro-expressions) based on the runtime micro-motions. For instance, the micro-expression determiner 724 may determine one or more patterns of one or more micro-motions as micro-expressions. The micro-expression(s) (e.g., micro-expression data) may be provided to the micro-expression analyzer 758. The micro-expression(s) may be utilized to determine subject duress to determine subject willingness, for example.

The micro-expression analyzer 758 may compare the micro-expression(s) with the training information (e.g., micro-expression profile). For example, the micro-expression analyzer 758 may check for outliers (in space and/or in a time sequence) against the regular micro-expressions characteristic (e.g., micro-expression profile) of the subject (e.g., authorized user). In some approaches, the micro-expression analyzer 758 may detect one or more (micro-expression) outliers as one or more micro-expressions that are outside of a threshold from a model micro-expression (e.g., micro-expression cluster, micro-expression average, etc.). For example, if a micro-expression is outside of a standard deviation (or two standard deviations, or some other distance from a mean, etc.), the micro-expression may be an outlier. One or more outliers may indicate that the subject is severely stressed and/or under duress. Authentication (e.g., access) may be denied if the subject is severely stressed and/or under duress.

Additionally or alternatively, the micro-expression analyzer 758 may explicitly check for micro-expressions that are determinant of stress. For example, in a case that the training information includes one or more micro-expressions that indicate severe stress and/or duress, the electronic device 102 may compare the runtime "duress" micro-expression(s) to the "duress" micro-expression(s) from the training information (e.g., micro-expression profile).

In some approaches, the micro-expression analyzer 758 may produce micro-expression results. The micro-expression results may indicate whether the micro-expression(s) indicate severe stress and/or duress. Additionally or alternatively, the micro-expression results may indicate a probability or confidence of whether the micro-expression(s) indicate severe stress and/or duress. In some configurations, the micro-expression analyzer 758 may determine a micro-expression matching confidence value. The micro-expression matching confidence value may indicate a degree of matching between the at least one micro-expression and a micro-expression profile. The micro-expression results may include the micro-expression matching confidence value in some configurations.

The micro-expression analyzer 758 may provide the micro-expression results to the authenticator 730. The authenticator 730 may perform authentication (e.g., make an authentication decision) for one or more subjects (e.g., users). For example, the authenticator 730 may perform authentication based on one or more factors. For instance, the authenticator 730 may determine whether one or more subjects (e.g., faces) in the set of image frames are authorized subjects based on the screen detection results, based on the facial rigidity results, based on the micro-motion results, and/or based on the micro-expression results.

In some approaches, the authenticator 730 may determine an authentication decision (e.g., to verify authentication or deny authentication) based on one or more conditions. For example, if the screen detection results indicate that there is no screen (or that a recognized face is not being presented on a screen, for example), if the face recognition results indicate that an authorized subject (e.g., user) is recognized, if the facial rigidity results indicate that the recognized face is not rigid, if the micro-motion results indicate that a recognized face is a live face of the authorized user, and/or if the micro-expression results indicate that a recognized face is not under duress, then authenticator 730 may verify authentication. If one or more of the conditions (that are determined and/or implemented) are not met, the authenticator 730 may deny authentication.

In some approaches, the authenticator 730 may determine an authentication decision (e.g., to verify authentication or deny authentication) based on a combination of results. For example, the authenticator 730 may utilize one or more rules based on the probability or probabilities (and/or confidence values) of two or more results to determine whether to verify authentication or deny authentication. For example, the authenticator 730 may combine the probabilities (e.g., confidence values) of two or more results to determine an overall probability that a face in the set of image frames is a live face of an authorized subject. If the overall probability meets or exceeds a probability threshold, the authenticator 730 may verify authentication. If the overall probability is less than the probability threshold, the authenticator 730 may deny authentication. In other approaches, the authenticator 730 may utilize a multi-dimensional region in a multi-dimensional plane or space. For example, if a vector of two or more results (e.g., determinations and/or probabilities, etc.) is within the multi-dimensional region, the authenticator 730 may verify authentication. If the vector is outside of the multi-dimensional region (or on a border thereof, for example), the authenticator 730 may deny authentication.

It should be noted that one or more of the elements described in connection with FIG. 7 may be optional. For example, some configurations may not include and/or utilize the micro-expression determiner 724 and/or the micro-expression analyzer 758. Depending on the configuration, for instance, the authenticator 730 may utilize one or more of the results of screen detection, facial recognition analysis, the facial rigidity analysis, micro-motion analysis, and/or the micro-expression analysis to perform authentication. Additionally or alternatively, two or more of the elements described in connection with FIG. 7 may be combined in some configurations. For example, the facial motion determiner 754 and the micro-motion determiner 722 may be combined in some approaches (e.g., the micro-motions may be determined based on the facial motion determination). Additionally or alternatively, one or more of the elements described in connection with FIG. 7 may be divided in some configurations.

Figure 8:
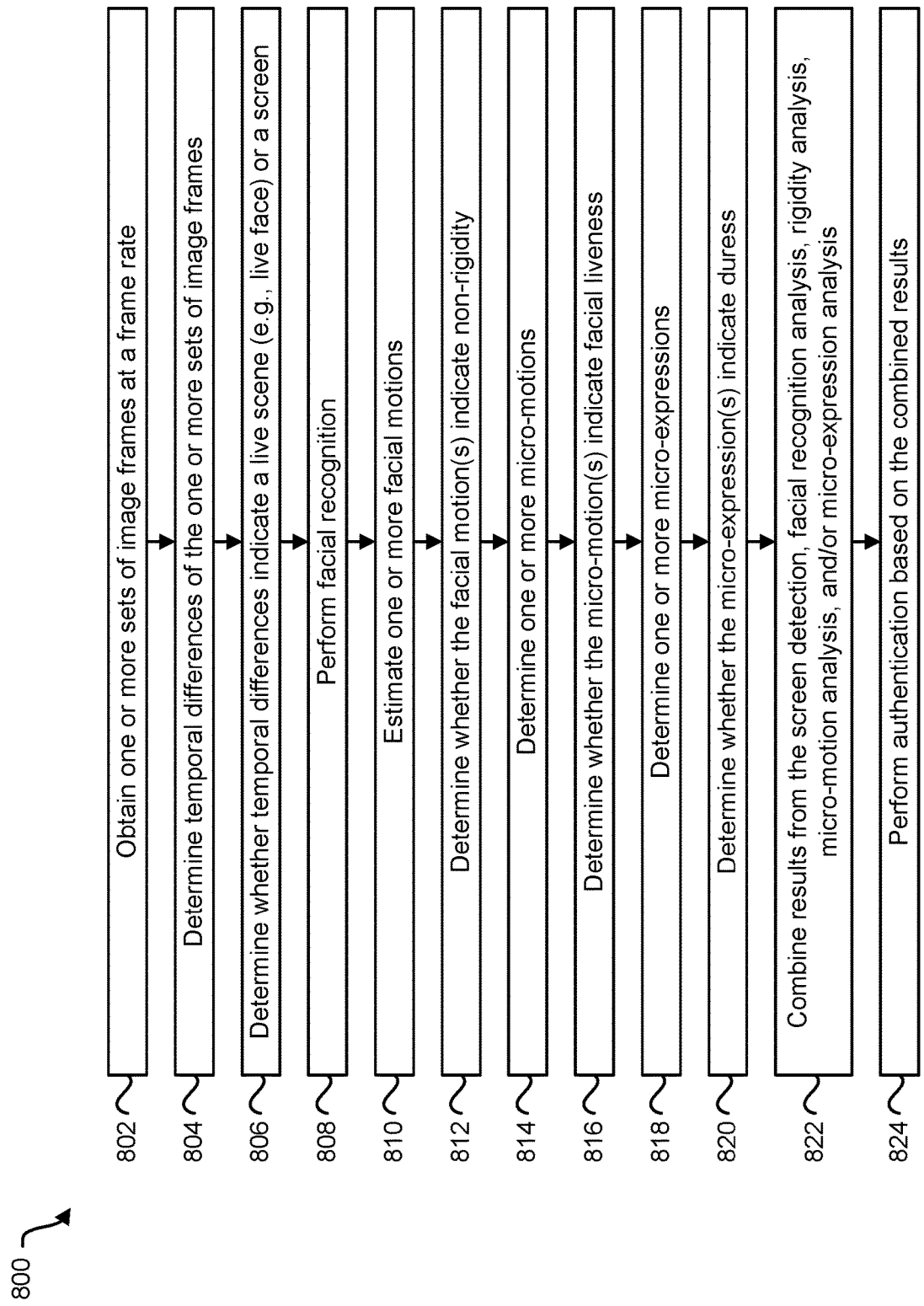
FIG. 8 is a flow diagram illustrating a more specific configuration of a method for facial authentication.

FIG. 8 is a flow diagram illustrating a more specific configuration of a method 800 for facial authentication. In some configurations, the electronic device 102 described in connection with FIG. 1 may perform the method 800 (or one or more steps of the method 800, for example).

The electronic device 102 may obtain 802 one or more sets of image frames at a frame rate. This may be accomplished as described in connection with one or more of FIGS. 1-2 and 6-7. For example, the electronic device 102 may obtain one or more sets of image frames (e.g., high speed video) captured at a frame rate (e.g., ≥120 FPS, ≥240 FPS, ≥480 FPS, etc.). The set(s) of images (e.g., video) may include one or more faces.

The electronic device 102 may determine 804 temporal differences of the one or more sets of image frames. This may be accomplished as described in connection with one or more of FIGS. 1 and 7.

The electronic device 102 may determine 806 whether temporal differences indicate a live scene (e.g., live face) or a screen. This may be accomplished as described in connection with one or more of FIGS. 1-3 and 7. For example, the electronic device 102 may perform screen detection.

The electronic device 102 may perform 808 facial recognition. This may be accomplished as described in connection with one or more of FIGS. 1 and 7.

The electronic device 102 may estimate 810 one or more facial motions. This may be accomplished as described in connection with one or more of FIGS. 1-2 and 7.

The electronic device 102 may determine 812 whether the facial motion(s) indicate non-rigidity. This may be accomplished as described in connection with one or more of FIGS. 1-2, 4, and 7.

The electronic device 102 may determine 814 one or more micro-motions. This may be accomplished as described in connection with one or more of FIGS. 1-2 and 5-7.

The electronic device 102 may determine 816 whether the micro-motion(s) indicate facial liveness for a particular subject. This may be accomplished as described in connection with one or more of FIGS. 1-2 and 6-7.

The electronic device 102 may determine 818 one or micro-expressions. This may be accomplished as described in connection with one or more of FIGS. 1-2 and 6-7.

The electronic device 102 may determine 820 whether the micro-expression(s) indicate duress (for a particular subject, for example). This may be accomplished as described in connection with one or more of FIGS. 1-2 and 6-7.

The electronic device 102 may combine 822 results from the screen detection, facial recognition analysis, rigidity analysis, micro-motion analysis, and/or micro-expression analysis (and/or background motion analysis). This may be accomplished as described in connection with one or more of FIGS. 1-2 and 6-7. For example, the electronic device 102 may combine the results from each of the determinations and/or may combine probabilities (and/or confidences) associated with each of the determinations.

The electronic device 102 may perform 824 authentication based on the combined results. This may be accomplished as described in connection with one or more of FIGS. 1-2 and 6-7. For example, the electronic device 102 may determine whether the combined results satisfy one or more criteria for authentication. In some approaches, the electronic device 102 may determine whether all of the determinations (or a threshold number or set of determinations, for example) satisfy authentication criteria. Additionally or alternatively, the electronic device 102 may determine whether an overall (e.g., combined) probability meets or exceeds a probability threshold.

In a case that the one or more authentication criteria are satisfied, the electronic device 102 may verify authentication. In a case that one or more of the authentication criteria are not satisfied, the electronic device 102 may deny authentication. It should be noted that one or more of the steps of the method 800 may be omitted in some configurations and/or may be performed in a different order in some configurations.

Figure 9:
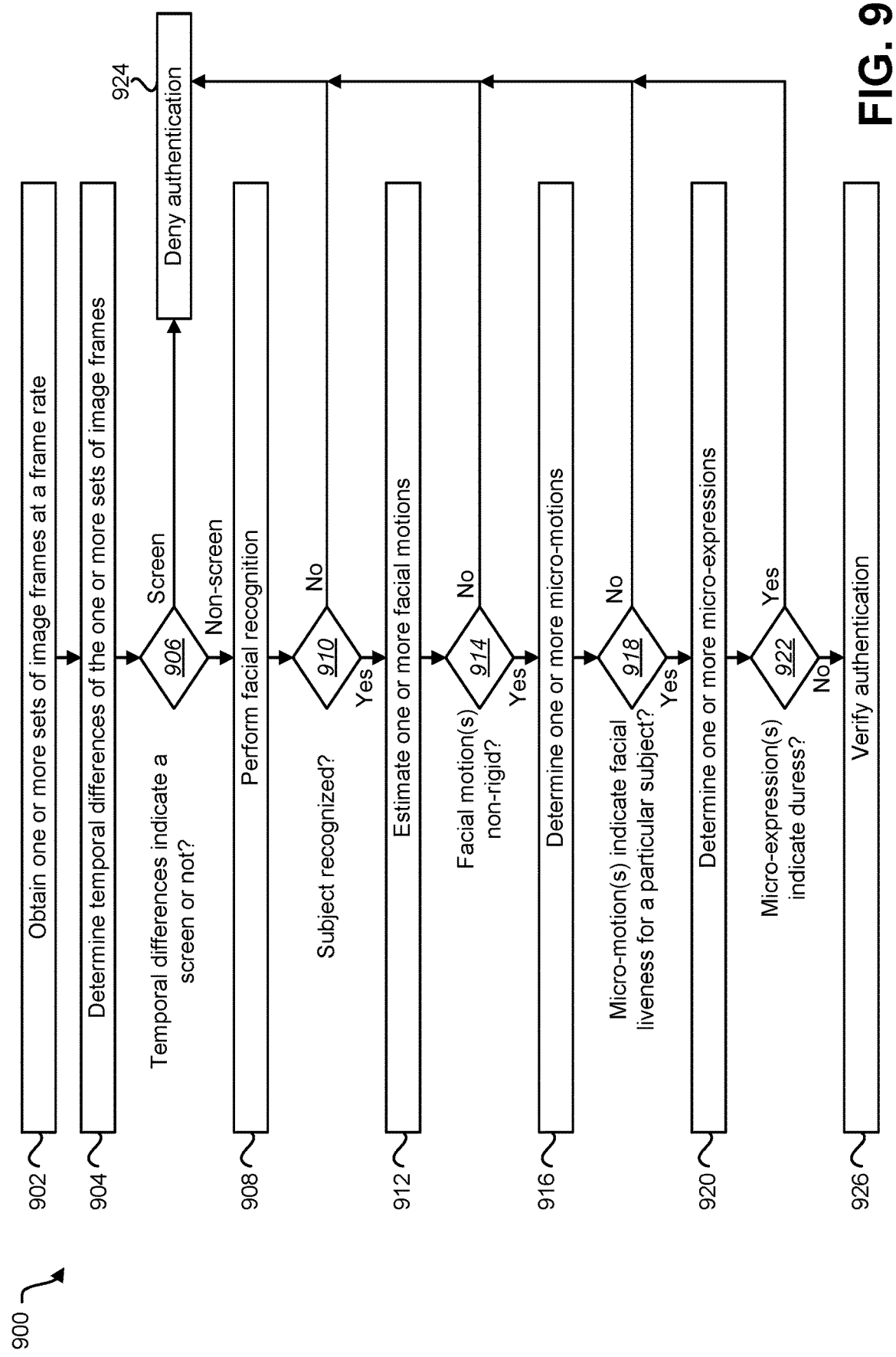
FIG. 9 is a flow diagram illustrating another more specific configuration of a method for facial authentication.

FIG. 9 is a flow diagram illustrating another more specific configuration of a method 900 for facial authentication. In some configurations, the electronic device 102 described in connection with FIG. 1 may perform the method 900 (or one or more steps of the method 900, for example).

The electronic device 102 may obtain 902 one or more sets of image frames at a frame rate. This may be accomplished as described in connection with one or more of FIGS. 1-2 and 6-7. For example, the electronic device 102 may obtain one or more sets of image frames (e.g., high speed video) captured at a frame rate (e.g., ≥120 FPS, ≥240 FPS, ≥480 FPS, etc.). The set(s) of images (e.g., video) may include one or more faces.

The electronic device 102 may determine 904 temporal differences of the one or more sets of image frames. This may be accomplished as described in connection with one or more of FIGS. 1 and 7.

The electronic device 102 may determine 906 whether temporal differences indicate a live scene (e.g., live face) or a screen. This may be accomplished as described in connection with one or more of FIGS. 1-3 and 7. For example, the electronic device 102 may perform screen detection. In a case that the temporal differences indicate a screen, the electronic device 102 may deny 924 authentication. In some approaches, if there are multiple faces in the set(s) of images, the electronic device 102 may deny 924 authentication for each face in a region with a detected screen.

In a case that the temporal differences do not indicate a screen (e.g., they indicate a non-screen), the electronic device 102 may perform 908 facial recognition. This may be accomplished as described in connection with one or more of FIGS. 1 and 7.

The electronic device 102 may determine 910 whether a subject (e.g., an authorized subject or authorized user) is recognized. This may be accomplished as described in connection with one or more of FIGS. 1 and 7. In a case that a subject (e.g., authorized subject) is not recognized, the electronic device 102 may deny 924 authentication.

In a case that a subject (e.g., authorized subject) is recognized, the electronic device 102 may estimate 912 one or more facial motions. This may be accomplished as described in connection with one or more of FIGS. 1-2 and 7.

The electronic device 102 may determine 914 whether the facial motion(s) indicate non-rigidity. This may be accomplished as described in connection with one or more of FIGS. 1-2, 4, and 7. In a case that the one or more facial motions do not indicate non-rigidity (e.g., in a case that the facial motion(s) indicate rigidity), the electronic device 102 may deny 924 authentication.

In a case that the one or more facial motions indicate non-rigidity (e.g., flexibility), the electronic device 102 may determine 916 one or more micro-motions. This may be accomplished as described in connection with one or more of FIGS. 1-2 and 5-7.

The electronic device 102 may determine 918 whether the micro-motion(s) indicate facial liveness for a particular subject. This may be accomplished as described in connection with one or more of FIGS. 1-2 and 6-7. In a case that the micro-motion(s) do not indicate facial liveness for the particular subject (e.g., authorized user), the electronic device 102 may deny 924 authentication.

In a case that the micro-motion(s) indicate facial liveness for the particular subject (e.g., authorized user), the electronic device 102 may determine 920 one or micro-expressions. This may be accomplished as described in connection with one or more of FIGS. 1-2 and 6-7.

The electronic device 102 may determine 922 whether the micro-expression(s) indicate duress (for a particular subject, for example). This may be accomplished as described in connection with one or more of FIGS. 1-2 and 6-7. In a case that the micro-expression(s) indicate duress (for the particular subject, for example), the electronic device 102 may deny 924 authentication.

In a case that the micro-expression(s) do not indicate duress for the particular subject (e.g., authorized user), the electronic device 102 may verify 926 authentication. This may be accomplished as described in connection with one or more of FIGS. 1 and 6-7.

Figure 10:
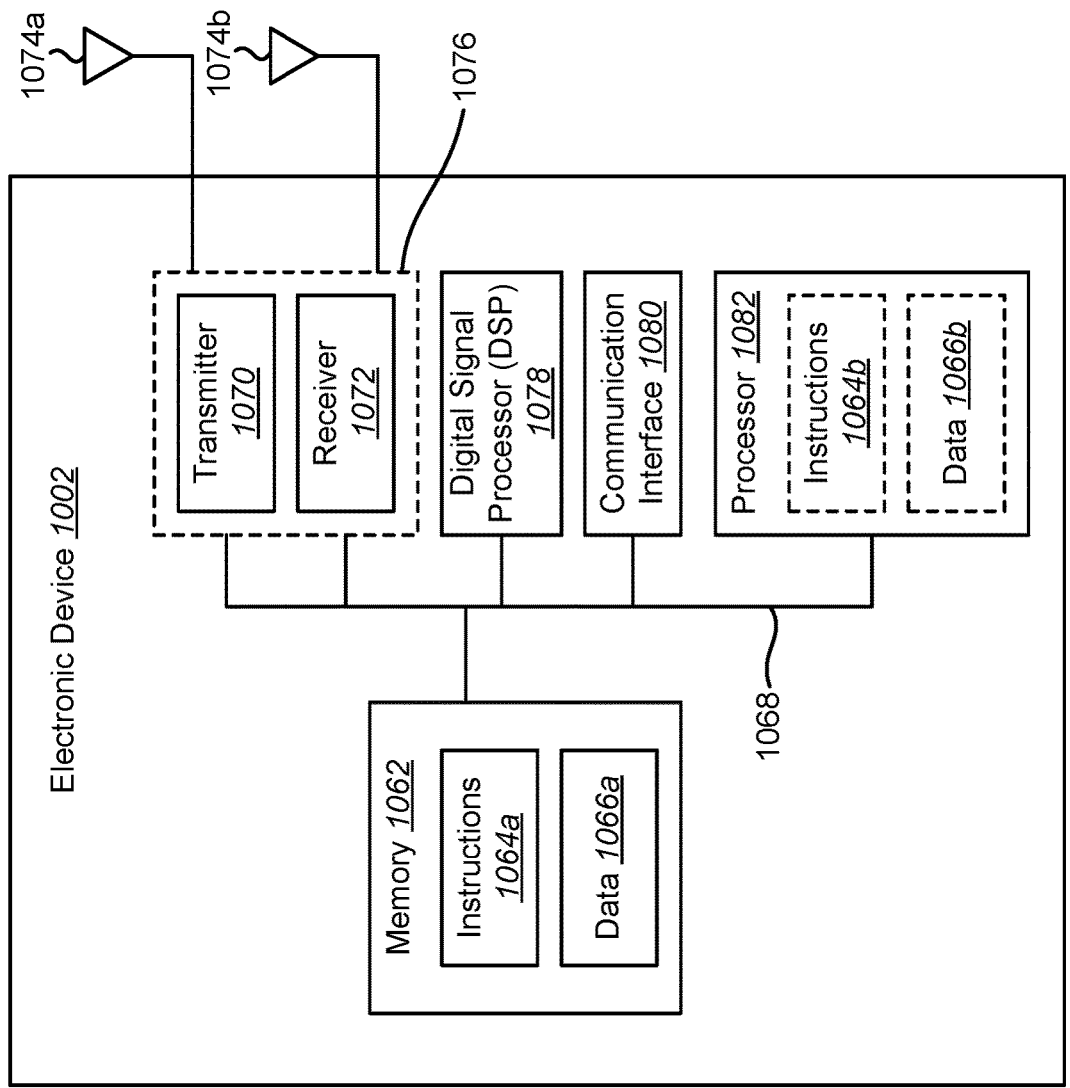
FIG. 10 illustrates certain components that may be included within an electronic device.

FIG. 10 illustrates certain components that may be included within an electronic device 1002. The electronic device 1002 may be an example of and/or may be implemented in accordance with the electronic device 102 described in connection with FIG. 1. The electronic device 1002 may be (or may be included within) a camera, video camcorder, digital camera, cellular phone, smart phone, computer (e.g., desktop computer, laptop computer, etc.), tablet device, media player, television, vehicle, automobile, personal camera, action camera, surveillance camera, mounted camera, connected camera, robot, aircraft, drone, unmanned aerial vehicle (UAV), healthcare equipment, gaming console, personal digital assistants (PDA), set-top box, etc. The electronic device 1002 includes a processor 1082. The processor 1082 may be a general purpose single- or multi-chip microprocessor (e.g., an advanced RISC machine (ARM)), a special purpose microprocessor (e.g., a digital signal processor (DSP)), a microcontroller, a programmable gate array, etc. The processor 1082 may be referred to as a central processing unit (CPU). Although just a single processor 1082 is shown in the electronic device 1002, in an alternative configuration, a combination of processors (e.g., an ARM and DSP) could be used.

The electronic device 1002 also includes memory 1062. The memory 1062 may be any electronic component capable of storing electronic information. The memory 1062 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

Data 1066a and instructions 1064a may be stored in the memory 1062. The instructions 1064a may be executable by the processor 1082 to implement one or more of the methods 200, 600, 800, 900 described herein. Executing the instructions 1064a may involve the use of the data 1066a that is stored in the memory 1062. When the processor 1082 executes the instructions 1064, various portions of the instructions 1064b may be loaded onto the processor 1082, and various pieces of data 1066b may be loaded onto the processor 1082.

The electronic device 1002 may also include a transmitter 1070 and a receiver 1072 to allow transmission and reception of signals to and from the electronic device 1002. The transmitter 1070 and receiver 1072 may be collectively referred to as a transceiver 1076. One or multiple antennas 1074a-b may be electrically coupled to the transceiver 1076. The electronic device 1002 may also include (not shown) multiple transmitters, multiple receivers, multiple transceivers, and/or additional antennas.

The electronic device 1002 may include a digital signal processor (DSP) 1078. The electronic device 1002 may also include a communication interface 1080. The communication interface 1080 may enable one or more kinds of input and/or output. For example, the communication interface 1080 may include one or more ports and/or communication devices for linking other devices to the electronic device 1002. Additionally or alternatively, the communication interface 1080 may include one or more other interfaces (e.g., touchscreen, keypad, keyboard, microphone, camera, etc.). For example, the communication interface 1080 may enable a user to interact with the electronic device 1002.

The various components of the electronic device 1002 may be coupled together by one or more buses, which may include a power bus, a control signal bus, a status signal bus, a data bus, etc. For the sake of clarity, the various buses are illustrated in FIG. 10 as a bus system 1068.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk, and Blu-Ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded, and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes, and variations may be made in the arrangement, operation, and details of the systems, methods, and apparatus described herein without departing from the scope of the claims.

What is claimed is:

1. A method performed by an electronic device, comprising:
   receiving a set of image frames, wherein the set of image frames includes a face;
   determining at least one facial motion of the face based on the set of image frames;
   determining, based on the at least one facial motion, a facial rigidity confidence value indicating a degree of confidence that the face is rigid to indicate whether the face is artificial;
   determining at least one facial micro-motion of the face based on the set of image frames;
   determining a micro-motion matching confidence value indicating a degree of matching between the at least one facial micro-motion and a micro-motion profile; and
   authenticating a user based on the facial rigidity confidence value and the micro-motion matching confidence value.

2. The method of claim 1, wherein determining the facial rigidity confidence value comprises determining a degree of matching between the at least one facial motion and a global model.

3. The method of claim 1, further comprising determining whether the face is presented on a screen.

4. The method of claim 3, wherein determining whether the face is presented on a screen comprises:
   determining temporal differences of the set of image frames; and
   determining whether the temporal differences indicate one or more step functions corresponding to one or more screen refreshes.

5. The method of claim 1, wherein the authenticating is further based on a screen detection confidence value.

6. The method of claim 1, wherein the set of image frames is captured at a frame rate of at least 120 frames per second.

7. The method of claim 1, wherein the set of image frames is captured at a frame rate of at least 240 frames per second.

8. The method of claim 1, further comprising:
   switching from a first capture rate to a second capture rate, wherein the set of image frames is captured at the second capture rate, and wherein the second capture rate is higher than the first capture rate; and
   switching from the second capture rate to the first capture rate after capturing the set of image frames.

9. The method of claim 1, further comprising determining one or more facial micro-expressions, wherein the authenticating is based on the one or more facial micro-expressions.

10. The method of claim 9, further comprising determining whether the one or more facial micro-expressions indicate duress.

11. An electronic device, comprising:
   a memory;
   a processor coupled to the memory, wherein the processor is configured to:
      receive a set of image frames, wherein the set of image frames includes a face;
      determine at least one facial motion of the face based on the set of image frames;
      determine, based on the at least one facial motion, a facial rigidity confidence value indicating a degree of confidence that the face is rigid to indicate whether the face is artificial;
      determine at least one facial micro-motion of the face based on the set of image frames;
      determine a micro-motion matching confidence value indicating a degree of matching between the at least one facial micro-motion and a micro-motion profile; and
      authenticate a user based on the facial rigidity confidence value and the micro-motion matching confidence value.

12. The electronic device of claim 11, wherein the processor is configured to determine the facial rigidity confidence value by determining a degree of matching between the at least one facial motion and a global model.

13. The electronic device of claim 11, wherein the processor is configured to determine whether the face is presented on a screen.

14. The electronic device of claim 13, wherein the processor is configured to determine whether the face is presented on a screen by:
   determining temporal differences of the set of image frames; and
   determining whether the temporal differences indicate one or more step functions corresponding to one or more screen refreshes.

15. The electronic device of claim 11, wherein the processor is configured to authenticate further based on a screen detection confidence value.

16. The electronic device of claim 11, wherein the set of image frames is captured at a frame rate of at least 120 frames per second.

17. The electronic device of claim 11, wherein the set of image frames is captured at a frame rate of at least 240 frames per second.

18. The electronic device of claim 11, wherein the processor is configured to:
   switch from a first capture rate to a second capture rate, wherein the set of image frames is captured at the second capture rate, and wherein the second capture rate is higher than the first capture rate; and
   switch from the second capture rate to the first capture rate after capturing the set of image frames.

19. The electronic device of claim 11, wherein the processor is configured to determine one or more facial micro-expressions, wherein the processor is configured to authenticate based on the one or more facial micro-expressions.

20. The electronic device of claim 19, wherein the processor is configured to determine whether the one or more facial micro-expressions indicate duress.

21. A non-transitory tangible computer-readable medium storing computer executable code, comprising:
   code for causing an electronic device to receive a set of image frames, wherein the set of image frames includes a face;
   code for causing the electronic device to determine at least one facial motion of the face based on the set of image frames;
   code for causing the electronic device to determine, based on the at least one facial motion, a facial rigidity confidence value indicating a degree of confidence that the face is rigid to indicate whether the face is artificial;
   code for causing the electronic device to determine at least one facial micro-motion of the face based on the set of image frames;
   code for causing the electronic device to determine a micro-motion matching confidence value indicating a degree of matching between the at least one facial micro-motion and a micro-motion profile; and
   code for causing the electronic device to authenticate a user based on the facial rigidity confidence value and the micro-motion matching confidence value.

22. The computer-readable medium of claim 21, wherein the code for causing the electronic device to determine the facial rigidity confidence value comprises code for causing the electronic device to determine a degree of matching between the at least one facial motion and a global model.

23. The computer-readable medium of claim 21, further comprising code for causing the electronic device to determine whether the face is presented on a screen.

24. The computer-readable medium of claim 21, further comprising code for causing the electronic device to authenticate further based on a screen detection confidence value.

25. The computer-readable medium of claim 21, further comprising code for causing the electronic device to determine one or more facial micro-expressions, wherein the code for causing the electronic device to authenticate is based on the one or more facial micro-expressions.

26. An apparatus, comprising:
- means for receiving a set of image frames, wherein the set of image frames includes a face;
- means for determining at least one facial motion of the face based on the set of image frames;
- means for determining, based on the at least one facial motion, a facial rigidity confidence value indicating a degree of confidence that the face is rigid to indicate whether the face is artificial;
- means for determining at least one facial micro-motion of the face based on the set of image frames;
- means for determining a micro-motion matching confidence value indicating a degree of matching between the at least one facial micro-motion and a micro-motion profile; and
- means for authenticating a user based on the facial rigidity confidence value and the micro-motion matching confidence value.

27. The apparatus of claim 26, wherein the means for determining the facial rigidity confidence value comprises means for determining a degree of matching between the at least one facial motion and a global model.

28. The apparatus of claim 26, further comprising means for determining whether the face is presented on a screen.

29. The apparatus of claim 26, wherein the means for authenticating is further based on a screen detection confidence value.

30. The apparatus of claim 26, further comprising means for determining one or more facial micro-expressions, wherein the means for authenticating is based on the one or more facial micro-expressions.

* * * * *